US012239916B2

(12) United States Patent
Shigeta

(10) Patent No.: US 12,239,916 B2
(45) **Date of Patent: *Mar. 4, 2025**

(54) MANAGEMENT SYSTEM AND MANAGEMENT METHOD FOR PACKAGES OF SHUFFLED PLAYING CARDS

(71) Applicant: ANGEL GROUP CO., LTD., Shiga (JP)

(72) Inventor: Yasushi Shigeta, Higashiomi (JP)

(73) Assignee: ANGEL GROUP CO., LTD., Shiga (JP)

( * ) Notice: Subject to any disclaimer, the term of this patent is extended or adjusted under 35 U.S.C. 154(b) by 136 days.

This patent is subject to a terminal disclaimer.

(21) Appl. No.: 17/900,087

(22) Filed: Aug. 31, 2022

(65) Prior Publication Data

US 2023/0001288 A1 Jan. 5, 2023

Related U.S. Application Data

(63) Continuation of application No. 16/855,626, filed on Apr. 22, 2020, now abandoned, which is a
(Continued)

(30) Foreign Application Priority Data

Mar. 7, 2015 (JP) ................................ 2015-061631

(51) Int. Cl.
*A63F 9/24* (2006.01)
*A63F 1/06* (2006.01)
(Continued)

(52) U.S. Cl.
CPC .................. *A63F 9/24* (2013.01); *A63F 1/06* (2013.01); *A63F 1/062* (2013.01); *A63F 1/12* (2013.01);
(Continued)

(58) Field of Classification Search
CPC .... A63F 9/24; A63F 1/06; A63F 1/062; A63F 1/12; A63F 2003/00164; A63F 2009/242;
(Continued)

(56) References Cited

U.S. PATENT DOCUMENTS 5,344,146 A * 9/1994 Lee ........................... A63F 1/12
273/149 R
6,403,908 B2 6/2002 Stardust et al.
(Continued)

FOREIGN PATENT DOCUMENTS

CN 1882377 A 5/2005
CN 103341263 A 10/2013
(Continued)

OTHER PUBLICATIONS

International Search Report dated Oct. 25, 2016 for corresponding/family PCT application PCT/US2016/072673 cites the U.S. patent and foreign patent documents above.
(Continued)

*Primary Examiner* — Michael D Dennis
(74) *Attorney, Agent, or Firm* — NORTON ROSE FULBRIGHT US LLP

(57) ABSTRACT

To prevent a loss or replacement of card packages while operating casinos using packages of multiple cards in the casinos or other card game facilities using card game tables, a management system for managing packages of shuffled playing cards is provided. The management system including a management control device stores ID codes attached to a plurality of packages brought into a management/storage box, constructs a database, reads the ID codes of the plurality of packages brought into the management/storage box at predetermined time intervals, confirms existence of each ID code registered in the database in the management/
(Continued)

storage box, and manages the ID codes of the packages before use and the ID codes of the drawn packages.

16 Claims, 16 Drawing Sheets

Related U.S. Application Data continuation of application No. 16/217,902, filed on Dec. 12, 2018, now Pat. No. 10,675,530, which is a continuation of application No. 15/556,225, filed as application No. PCT/JP2016/056681 on Mar. 3, 2016, now Pat. No. 10,220,300.

(51) Int. Cl.
*A63F 1/12* (2006.01)
*A63F 3/00* (2006.01)
*A63F 11/00* (2006.01)
*G07F 17/32* (2006.01)

(52) U.S. Cl.
CPC ........ *G07F 17/322* (2013.01); *G07F 17/3241* (2013.01); *G07F 17/3293* (2013.01); *A63F 2003/00164* (2013.01); *A63F 2009/242* (2013.01); *A63F 2009/2425* (2013.01); *A63F 2009/2439* (2013.01); *A63F 11/00* (2013.01); *A63F 2250/24* (2013.01); *A63F 2250/58* (2013.01)

(58) Field of Classification Search
CPC ......... A63F 2009/2439; A63F 2250/24; G07F 17/322
See application file for complete search history.

(56) References Cited

U.S. PATENT DOCUMENTS

| | | | | |
|---|---|---|---|---|
| 10,675,530 | B2 | 6/2020 | Shigeta | |
| 2002/0155869 | A1 | 10/2002 | Soltys et al. | |
| 2005/0110210 | A1 | 5/2005 | Soltys et al. | |
| 2007/0024449 | A1* | 2/2007 | Bilyeu | G06K 17/00 340/573.1 |
| 2010/0090405 | A1* | 4/2010 | Snow | G07F 17/323 273/148 R |
| 2011/0130185 | A1 | 6/2011 | Walker | |
| 2013/0130185 | A1* | 5/2013 | Herlevi | F27B 21/06 432/12 |
| 2013/0292902 | A1 | 11/2013 | Shigeta | |
| 2015/0042042 | A1 | 2/2015 | Shigeta | |
| 2017/0106270 | A1 | 4/2017 | Shigeta | |

FOREIGN PATENT DOCUMENTS

| | | | |
|---|---|---|---|
| CN | 20050110210 | A | 10/2013 |
| EP | 2835159 | A1 | 2/2015 |
| JP | 2008081238 | A | 4/2008 |
| JP | 2015-037550 | A | 2/2015 |
| KR | 10-2015-0018472 | A | 2/2015 |
| WO | 00/71438 | A1 | 11/2000 |
| WO | 2006/026480 | A2 | 3/2006 |
| WO | 2009126780 | A2 | 10/2009 |
| WO | 2013172038 | A1 | 11/2013 |
| WO | 2015019619 | A1 | 2/2015 |

OTHER PUBLICATIONS

First Examination Report dated Jan. 25, 2018 issued in corresponding/family AU application 2016230242 cites the U.S. patent and foreign patent documents above.
New Zealand First Examination Report dated May 16, 2018 issued in corresponding/family NZ application 735284 cites the U.S. patent and foreign patent documents above.
Singapore First Written Opinion dated Jun. 8, 2018 issued in corresponding/family SG application 11201707248X cites the U.S. patent and foreign patent documents above.
Korean Office Action dated Aug. 16, 2018 issued in corresponding/family KR application 10-2017-7024982 cites the U.S. patent and foreign patent documents above.
Australian Examination Report No. 1 dated Sep. 25, 2019 issued in corresponding/family AU Application 2019200486 cites the patent document above.
Chinese Office Action dated Feb. 6, 2020 issued in corresponding/family CN Application 201680014139.9 cites the patent documents above.

* cited by examiner

Fig. 11

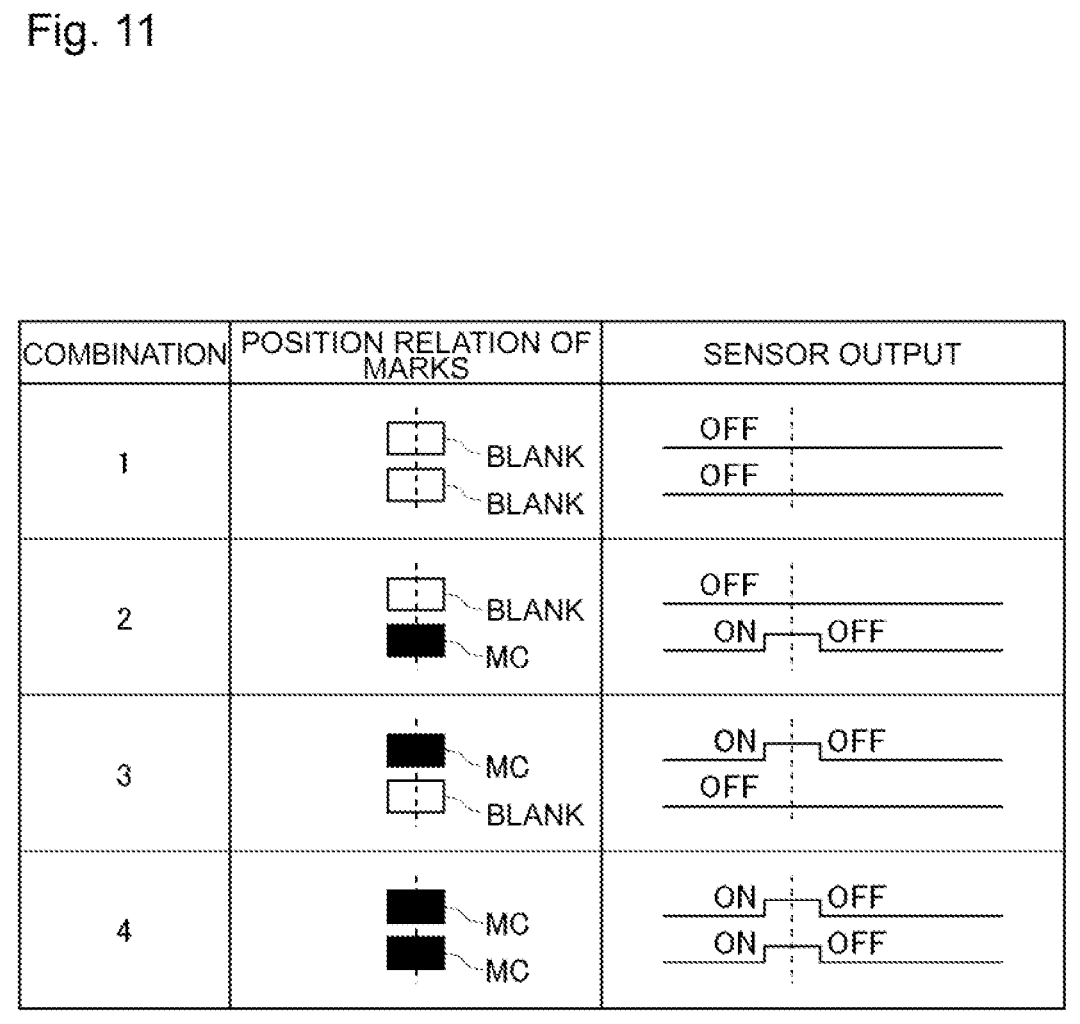

| COMBINATION | POSITION RELATION OF MARKS | SENSOR OUTPUT |
|---|---|---|
| 1 | BLANK<br>BLANK | OFF<br>OFF |
| 2 | BLANK<br>MC | OFF<br>ON OFF |
| 3 | MC<br>BLANK | ON OFF<br>OFF |
| 4 | MC<br>MC | ON OFF<br>ON OFF |

MANAGEMENT SYSTEM AND MANAGEMENT METHOD FOR PACKAGES OF SHUFFLED PLAYING CARDS

CROSS REFERENCES TO RELATED APPLICATIONS

This application is a continuation of U.S. patent application Ser. No. 16/855,626 filed Apr. 22, 2020, which is a continuation from U.S. patent application Ser. No. 16/217,902 filed Dec. 12, 2018 (now U.S. Pat. No. 10,675,530), which is a continuation from U.S. patent application Ser. No. 15/556,225 filed Sep. 6, 2017 (now U.S. Pat. No. 10,220,300), which is a national stage application pursuant to 35 USC § 371 from International Pat. App. No. PCT/JP2016/056681 filed Mar. 3, 2016, which claims priority under 35 USC § 119 to JP Pat. App. No. 2015-061631 filed Mar. 7, 2015; the disclosures of each application are hereby incorporated by reference in their entireties.

TECHNICAL FIELD

The present invention relates to a management system and a management method for packages of shuffled playing cards to prevent a loss or replacement of card packages while operating casinos using packages of multiple cards in casinos or other card game facilities using card game tables.

BACKGROUND ART

There are baccarat and blackjack in a large number of live table games played in casinos or game facilities. These games use a standard deck of 52 playing cards and the playing cards are distributed from a shooter with a plurality of decks (6 to 9 or 10 decks) shuffled in advance to a game table. Because an operator (hereinafter, referred to as a "dealer") of the casino distributes the playing cards to the game table to be used in such games, results (winners or winning hands) of the games are determined by arrangement of the cards of the plurality of decks from the shooter. For these purposes, when the packages of the plurality of decks shuffled are used in the casinos, playing cards of a predetermined number of decks are shuffled in random order (arrangement), are individually packed as one package, and are used.

A shortage or replacement of cards should not occur in the casinos. The reason is that, if a person with an unjust purpose reads the arrangement of the cards in the package and returns the package or replaces the cards with cards with known arrangement, the arrangement of the cards distributed by the dealer is known when the read package is used, so that the person can predict a result of a game. To ensure a fair game by preventing the shortage or replacement of the packages of the shuffled playing cards in the casinos, the casinos manage the packages of the shuffled playing cards to properly play the game on the table (that is, the casinos perform the management such that there is no replacement of the packages of the shuffled playing cards or other accidental or unjust actions). The management of the packages of shuffled playing cards is known and is disclosed in International Application Publication No. WO 2015/019619

SUMMARY OF INVENTION

The present invention provides a management method or system for monitoring packages of shuffled playing cards in a casino, in which the packages of the shuffled playing cards in the casino is managed centering around a game table, so that missing (temporary missing) or shortage of the packages of the shuffled playing cards in the casino can be managed and replacement can be prevented. This management is important. The reason is that, in the case in which the package of the shuffled playing cards on the table is lost in the casino once, even if the package is found again later, someone may know or record the arrangement of the cards in the package during missing. For example, if someone previously reads arrangement of some cards or an entire package of cards or replaces the package while the package is carried to the game table, someone may win a game in the table on which the replaced or read package is carried.

To prevent the above problems, management needs to be performed to prevent occurrence of missing or replacement of the package of the playing cards used for the game in the casino or mixing of an unknown package, until an operator (dealer) takes out the package after the package is carried to the game table.

To resolve the problems according to the related art, a management system according to the present invention is a system for managing packages of shuffled playing cards, the management system including: packages of shuffled playing cards in which playing cards configuring a predetermined number of decks are shuffled in random order and are packed individually as one package and to which unique ID codes are attached; a game table on which a game is played using the shuffled playing cards; a card shooter device which is arranged on the game table, receives the shuffled playing cards in the packages, enables the shuffled playing cards to be manually fed one by one on the game table, and reads at least ranks of the playing cards; a storage box which is installed on the game table, stores the plurality of packages, and includes an opening/closing cover which allows the packages to be taken out one by one; one or more ID code readers which read ID codes of all of the packages stored in the storage box as ID codes of packages before use; a registration device of an ID code which registers ID codes of the packages being taken out or having been taken out from the storage box, as taken out (scheduled to be used for the game, in use, or used) packages; and a management control device which includes a memory storing ID codes of the plurality of packages brought into the storage box and constructing a database and reads the ID codes of the plurality of packages brought into the storage box at predetermined time intervals, confirms existence of each ID code registered in the database in the storage box, and manages the ID codes of the packages before the use and ID codes of the taken out packages.

In the system for managing the packages according to the present invention, the following specific forms may be included. That is, the management control device further has a time stamping device which stores confirmation time of the existence of each ID code in the storage box and the management control device is configured to be programmed to examine the packages with respect to at least one of: 1) the time stamping device further stores time when the ID codes are registered as the ID codes of the taken out packages in the registration device and whether or not the time from when the package does not exist in the storage box to when the ID codes are registered as the ID codes of the taken out packages in the registration device exceeds a predetermined time; 2) whether or not the ID codes registered as the ID codes of the taken out packages in the registration device exist in the database of the ID codes brought into the storage box; 3) whether or not the packages exist in the storage box during a predetermined period or more; and 4) whether or not the ID codes has been registered as the ID codes of the taken out packages in the past.

Furthermore, the management system includes at least one of: 1) a device reading the ID codes of the packages of the shuffled playing cards arranged on the game table and scheduled to be set in the card shooter device or being set in the card shooter device; and 2) a device connected to a card discard device receiving the shuffled playing cards used for a game and acquiring ID codes of used packages to be discarded as the registration device of the ID codes of the taken out packages. Furthermore, the management control device has a database in which ID codes of contained packages can be searched from a container ID, a pallet ID, or a carton ID holding the packages, and the ID codes of the taken out packages can be acquired from the container ID, the pallet ID, or the carton ID.

In the management system according to the present invention, at least one of the following items of (1) to (4) is recorded and managed in the database in association with the ID codes of the packages of the shuffled playing cards: (1) a game table to be used; (2) a dealer (a person who draws a card) who is in charge of the game table to be used; (3) expected time of each package of the shuffled playing cards to be used in the game table; and (4) information on the storage box to which each package of the shuffled playing card is delivered.

Furthermore, the management control device is included in a game table management device arranged on the game table and the game table management device is connected directly or indirectly to the card shooter device on the game table. In addition, the card shooter device can read at least the ranks of the shuffled playing cards manually fed one by one on the game table. Furthermore, the card shooter device can count a sheet number of the shuffled playing cards manually fed one by one on the game table. The card discard device receiving the shuffled playing cards used for the game can read at least the ranks of the shuffled playing cards used for the game, receive information from the card shooter device, and determine whether or not information of the shuffled playing cards manually fed one by one on the game table and information read by the card discard device are matched.

To resolve the problems according to the related art, a method for managing packages according to the present invention is a method for managing packages of shuffled playing cards, in which playing cards configuring a predetermined number of decks are shuffled in random order and are packed individually as a set of shuffled playing cards and ID codes are attached to packages of the set, the management method including: a step of storing the packages in a storage box which is installed on the game table, stores the plurality of packages, and includes an opening/closing cover which allows the packages to be taken out one by one; a step of reading ID codes of the plurality of packages brought into the storage box by an ID code reader and constructing a database; a registration step of registering ID codes of the packages of the playing cards used for the game on the game table as taken out packages; and a step of reading the ID codes of the plurality of packages brought into the storage box at predetermined time intervals, confirming existence of each ID code registered in the database in the storage box, and comparing and managing the ID codes of the taken out packages registered by the registration step and the ID codes registered in the database.

The method for managing the packages of the shuffled playing cards according to the present invention may have the following forms additionally. That is, the comparison and management step specifies ID codes of packages of which existence is not confirmed in the storage box, stores time when the existence is not confirmed in the storage box, together with the ID codes of the packages of which the existence is not confirmed, and manages whether or not the time from when the existence is not confirmed to when the ID codes are registered as the ID codes of the taken out packages by the registration device exceeds a predetermined time. Furthermore, the registration step is a step of using a database in which ID codes of all packages contained in a carton containing the packages can be searched from a carton ID attached to the carton, reading the carton ID of the used carton to specify the ID codes of the packages contained in the carton, and registering the ID codes of all of the packages contained in the carton as the ID codes of the taken out packages. The management method further includes a feeding card reading step of reading at least ranks of the shuffled playing cards when the shuffled playing cards are manually fed one by one on the game table by the card shooter device; a discard card reading step of reading at least the ranks of the shuffled playing cards used for a game by the card discard device; and a determination step of determining whether or not information of the shuffled playing cards obtained by the feeding card reading step and information of the shuffled playing cards obtained by the discard card reading step are matched. The ID codes of the packages may be configured to be given to the packages by an RFID.

BRIEF DESCRIPTION OF DRAWINGS

FIG. 11 is an outline diagram illustrating a relation of outputs of ON signals of two UV sensors and marks according to an embodiment of the present invention.

DESCRIPTION OF PREFERRED EMBODIMENTS

Figure 1:
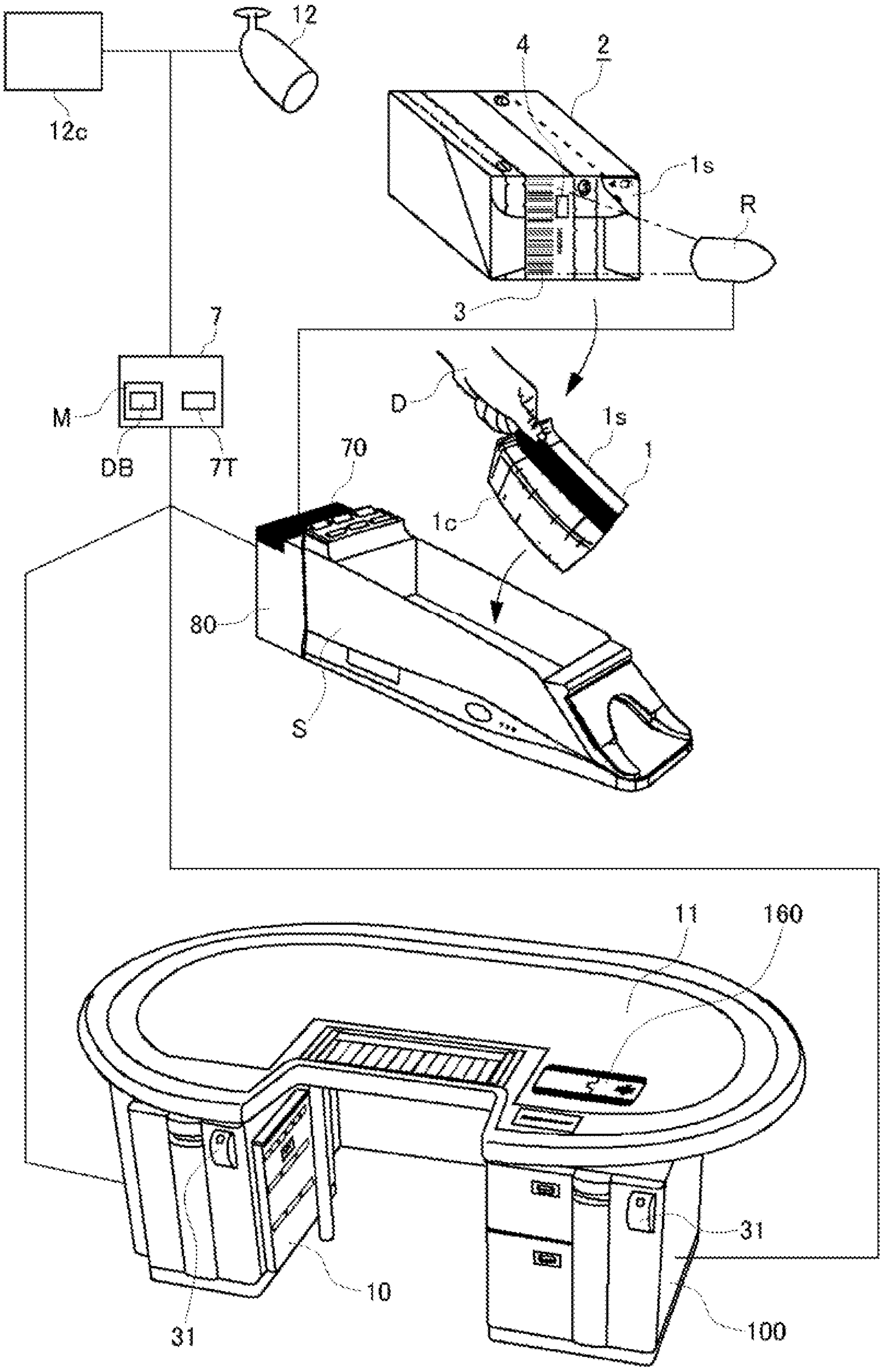
FIG. 1 is a perspective view of packages used in a card shooter device of a management system for packages of shuffled playing cards according to an embodiment of the present invention and unpacked shuffled playing cards.

An embodiment of a management system of shuffled playing cards according to the present invention will be described below. FIG. 1 is a diagram illustrating an outline of the case in which a package of shuffled playing cards arranged in random order to be used in a table game of a casino according to the embodiment of the present invention is used in the casino. In this embodiment, shuffled playing cards 1*s* are packed as a package 2. However, the package 2 is unpacked such that the shuffled playing cards is can be used for a game on a table and is set in a card shooter device S. During the game, a dealer D draws cards 1 from the card shooter device S and distributes the cards 1 to the game table. Cards of each shuffled playing card is composed of a predetermined number of decks (normally, 6, 8, 9, or 10 decks) are manufactured to be randomly shuffled and become individually unique random arrangement and are packed with an ID code 4 given to the package 2 as a bar code 3 which can be individually identified by a bar code reader R. An RFID (or an RF tag) may be attached as the ID code 4 instead of or together with the bar code 3. A management control device 7 in a casino 6 is used to manage whether or not there is a lost package. While the package 2 is lost or missing, someone may mix or replace cards of the package 2 with cards previously arranged in constant arrangement to control or win the game on the table. To resolve the above problems, the management control device 7 in this application manages the package 2 of the shuffled playing cards is. The management control device 7 is realized by a computer device (as a management control device having the following functions) and functions of a method and a process are realized by installing a program executed by a computer processor in a computer.

The package 2 to which the individual ID code 4 (bar code 3) is attached is packed in a carton CA in units of 18 and is carried to at least one game table 11 for use in game play. A management/storage box 10 is installed on the game table 11 and has a structure in which a plurality (in this embodiment, 18) of packages 2 are stored and the packages 2 can be taken out one by one. The card shooter device S is arranged on the game table 11 and the shuffled playing cards 1*s* in the package 2 can be received and can be manually fed one by one on the game table 11 by the dealer D. The card shooter device S can read at least the ranks of the fed playing cards 1*s*. One or more ID code readers (10R) that read the ID codes of all of the packages 2 stored in the management/storage box 10 as ID codes 4 of packages before use are arranged in the management/storage box 10 (it is described in detail later).

A registration device 70 that registers the ID code 4 of the package 2 taken out from the management/storage box 10 as the taken out (scheduled to be used for the game or used for the game (including in use)) package 2 is connected to the card shooter device S. A bar code reader R is connected to the registration device 70 of the ID codes, the ID code 4 of the package 2 taken out from the management/storage box 10 is read as the taken out package 2, and the registration device 70 registers the ID code as the ID code 4 of the taken out package 2 and sends registration information (ID code 4 or the like) to the management control device 7. The management control device 7 includes a memory M that stores the ID codes 4 of the plurality of packages 2 brought into the management/storage box 10 and constructs a database DB. In addition, the management control device 7 reads the ID codes 4 of the plurality of packages 2 brought into the management/storage box 10 at predetermined time intervals by the ID code reader (10R) and confirms existence of each ID code 4 registered in the database in the management/storage box 10. Therefore, the management control device 7 has a time stamping device 7T to store confirmation time and manages the ID code 4 of the package 2 before use and the ID code 4 of the taken out package 2. The playing cards 1*s* fed by the card shooter device S are used for a table game such as baccarat and the shuffled playing cards 1*s* used for the game are received by a card discard device 100 (to be described later).

Figure 2:
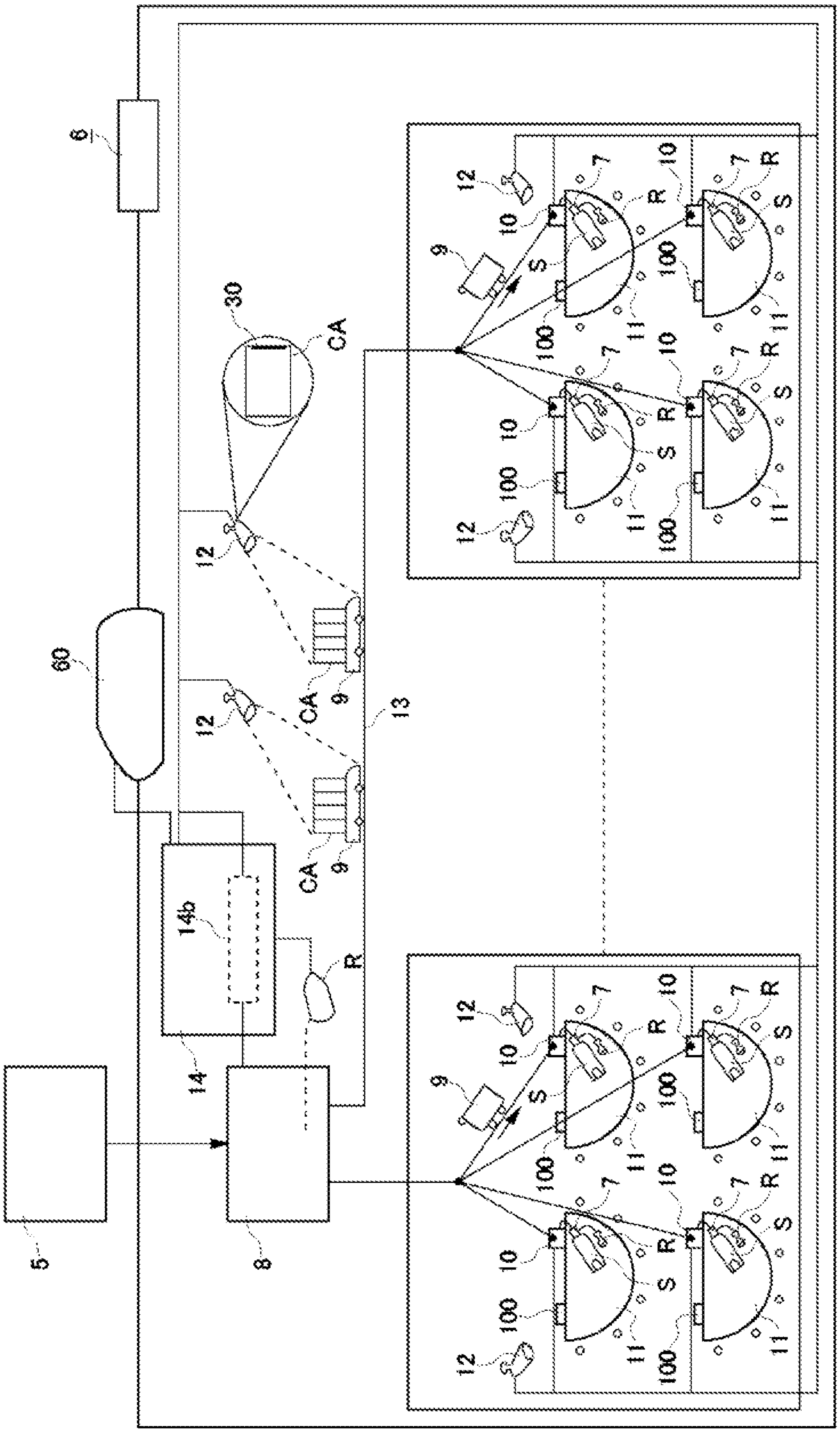
FIG. 2 is a diagram illustrating an entire outline of a management system for packages of shuffled playing cards according to an embodiment of the present invention.

Next, an outline of management of the package 2 mainly using the management control device 7 in the casino 6 will be described using FIGS. 2 and 3 before the detailed description of each part in the embodiment of the management system of the shuffled playing cards. The shuffled decks of the playing cards 1*s* are shuffled in advance to be arranged in random order by a card shuffle device (not illustrated in the drawings), are packed in the package 2, are packed in a factory 5 by a sealing material and a shrink packaging material, and are shipped. The package 2 is supplied from the factory 5 to a back yard (warehouse or the like) 8. The 18 packages of the shuffled playing cards 1*s* are packed in the carton CA and are normally delivered to the casino 6 by packing of the carton CA. Normally, the 18 packages 2 are packed and stored in the carton CA and are carried from the back yard 8 to the management/storage box 10 of the game table 11 (including beside or below the game table 11) by a plurality of vehicles 9. The packages 2 are stored during a constant period in the management/storage box 10 of the game table 11 until the packages 2 are taken out manually by the dealer D or the like. Then, the packages 2 are taken out manually from the management/storage box 10 of the game table 11 by the dealer D or the like in a state of the packages 2, are arranged on the game table 11, and are used for the game.

All of the packages 2 (or the cartons CA storing the packages 2) in the casino 6 are monitored by reading the ID codes (or carton ID codes 30 of the cartons CA storing the packages 2) of all of the packages 2 of the shuffled playing cards at a predetermined place by a monitoring camera 12 or the ID code reader 10R. The monitoring camera 12 is arranged or provided to read the bar codes 3 (as ID codes)

(or the carton ID codes 30 of carton CA storing the packages 2) of all of the packages 2 of the shuffled playing cards is in the management/storage box 10 of the game table 11 from the back yard 8.

Figure 3:
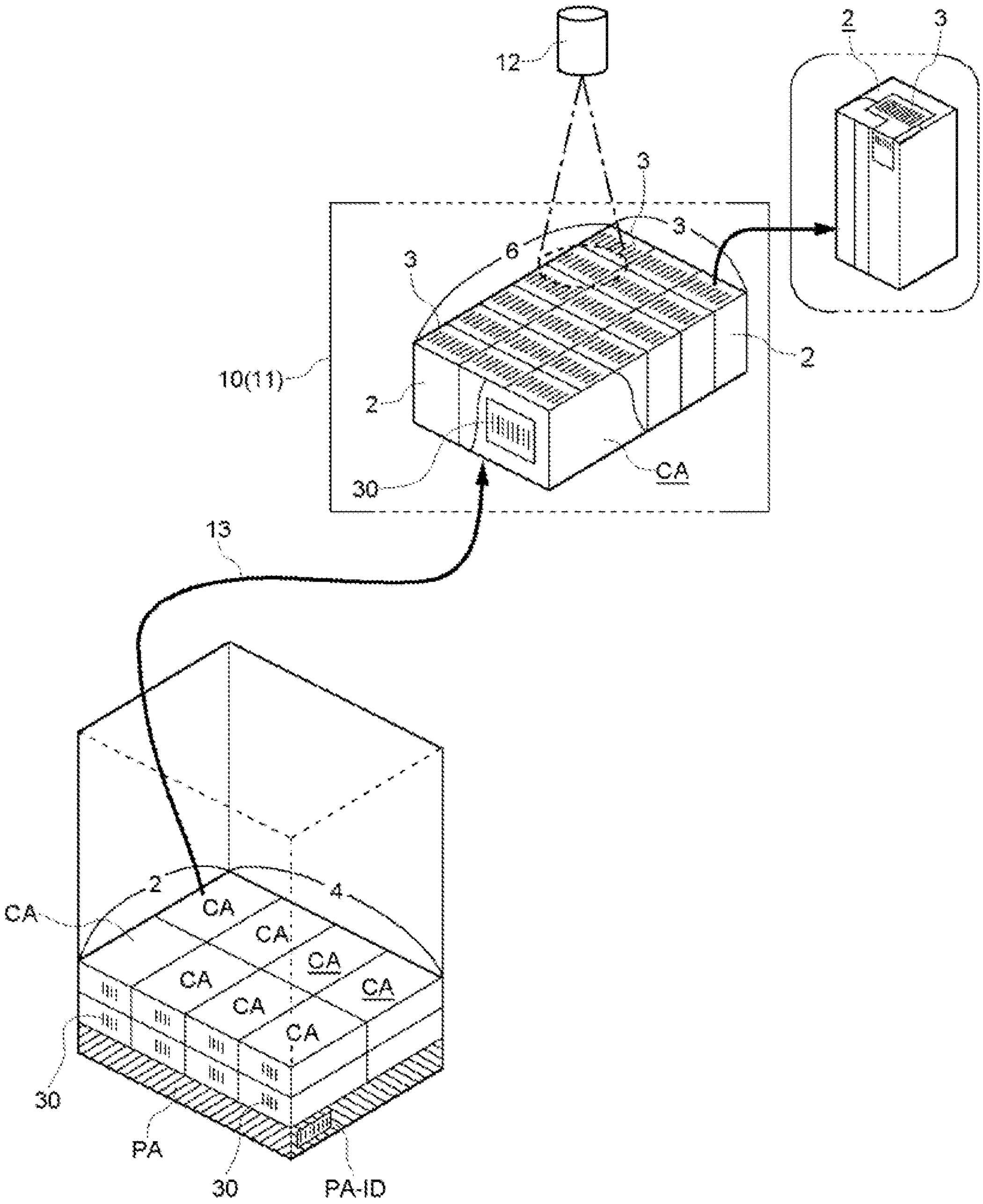
FIG. 3 is a perspective view illustrating the case in which one shuffled playing card according to an embodiment of the present invention is carried in a form of being deposited in a package, a carton, or a pallet from a factory to a back yard and a management/storage box of a casino table.

While the packages 2 to which the bar codes 3 are attached are carried to the casino 6, the packages 2 are stored in the carton CA and the carton CA is arranged on a pallet PA and is stored in the back yard 8 (refer to FIG. 3). The unique carton ID code 30 is attached to each carton CA and a unique pallet ID code PA-ID is attached to each palette PA. The carton ID code 30 is registered in advance in the database DB of the management control device 7 in association with the ID codes of the packages stored in the carton CA. The pallet ID code PA-ID is registered in advance in the database DB of the management control device 7 in association with the carton ID code 30 on the corresponding pallet PA and the ID codes 4 of the packages 2 stored in the carton CA. All of the ID codes of the packages 2 are associated with the carton ID code 30 in which the packages 2 are stored and the pallet ID code PA-ID.

Next, each part in the embodiment of the management system of the shuffled playing cards will be described in detail. Normally, the packages 2 are carried from the back yard 8 to the management/storage box 10 of the game table 11 in a state of being stored in the carton CA. However, the embodiment is not limited thereto. The packages 2 can be loaded into the vehicles 9 and can be carried by the vehicles 9. The plurality of packages 2 (at least 18 or 36 packages) are stored in the management/storage box 10 of each game table 11 and are manually carried to the game table 11 therefrom. At this time, the monitoring camera 12 or the like is used at a predetermined place of a delivery route 13 in the casino 6, so that the vehicle 9 holding the carton CA or the package 2 is monitored by the management control device 7.

Figure 4A:
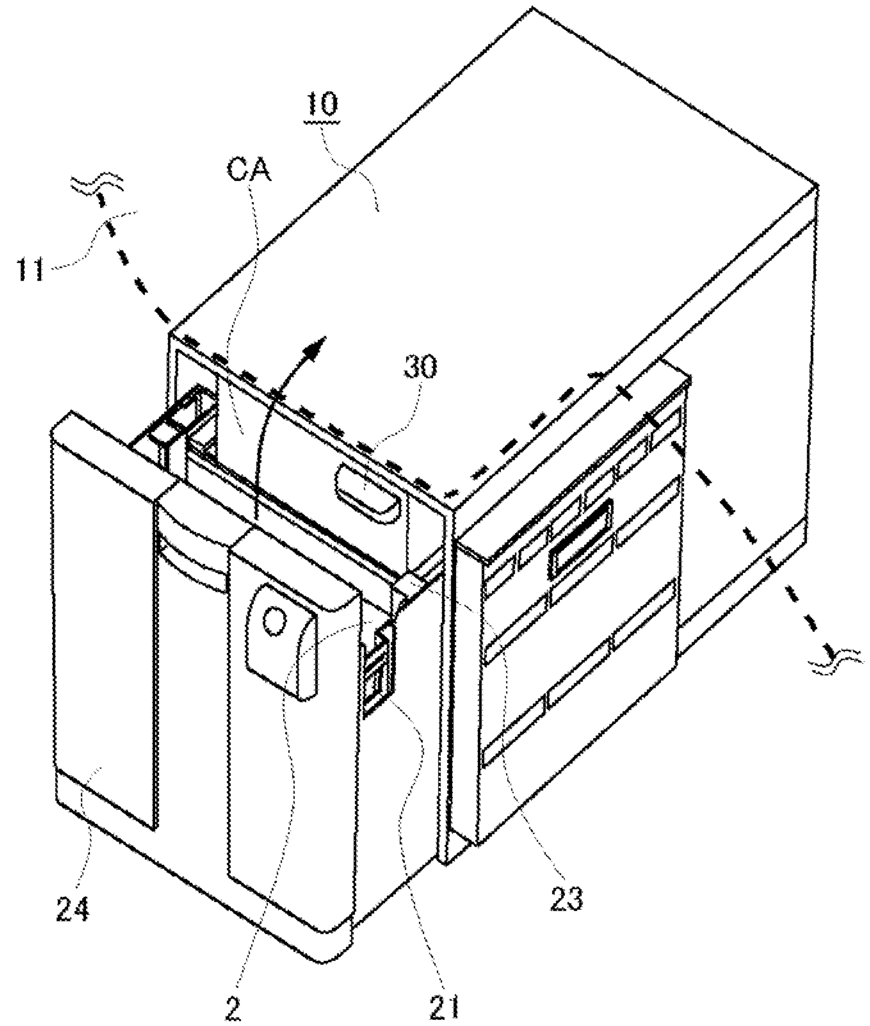
FIG. 4A is a perspective view illustrating a state in which a drawer-like front cover of a management/storage box according to an embodiment of the present invention is partially drawn and a package is exposed.

A structure of the management/storage box 10 will be described below using FIGS. 4A to 4C. In this embodiment, the management/storage box 10 is installed on the side of the game table 11, the plurality of packages 2 and cartons CA to be used for the game later are accommodated in the management/storage box 10, a drawer-like door 24 of the management/storage box 10 is configured to be opened and closed, and the door 24 can be opened a little such that the packages 2 to be used for a next game can be taken out one by one from the management/storage box 10 (refer to FIG. 4A). In addition, the shuffled playing cards is can be set in the card shooter device S. The management/storage box 10 in FIG. 1 is in a state in which the door 24 is closed and in FIG. 4A, the door 24 is in an opened state.

In the management/storage box 10, the ID code reader 10R to read the ID code 4 of each of the packages 2 of all of the shuffled playing cards is existing in the management/storage box 10 is provided for the purpose of storing the shuffled playing cards is used in the game table 11 in units of the packages 2 and a carton ID code reader 23 to read the ID code 30 of each of the cartons CA is provided in the management/storage box 10 for the purpose of storing the cartons CA in units of the cartons CA (the monitoring camera 12 or other reading device (not illustrated in the drawings) may be used).

Figure 4B:
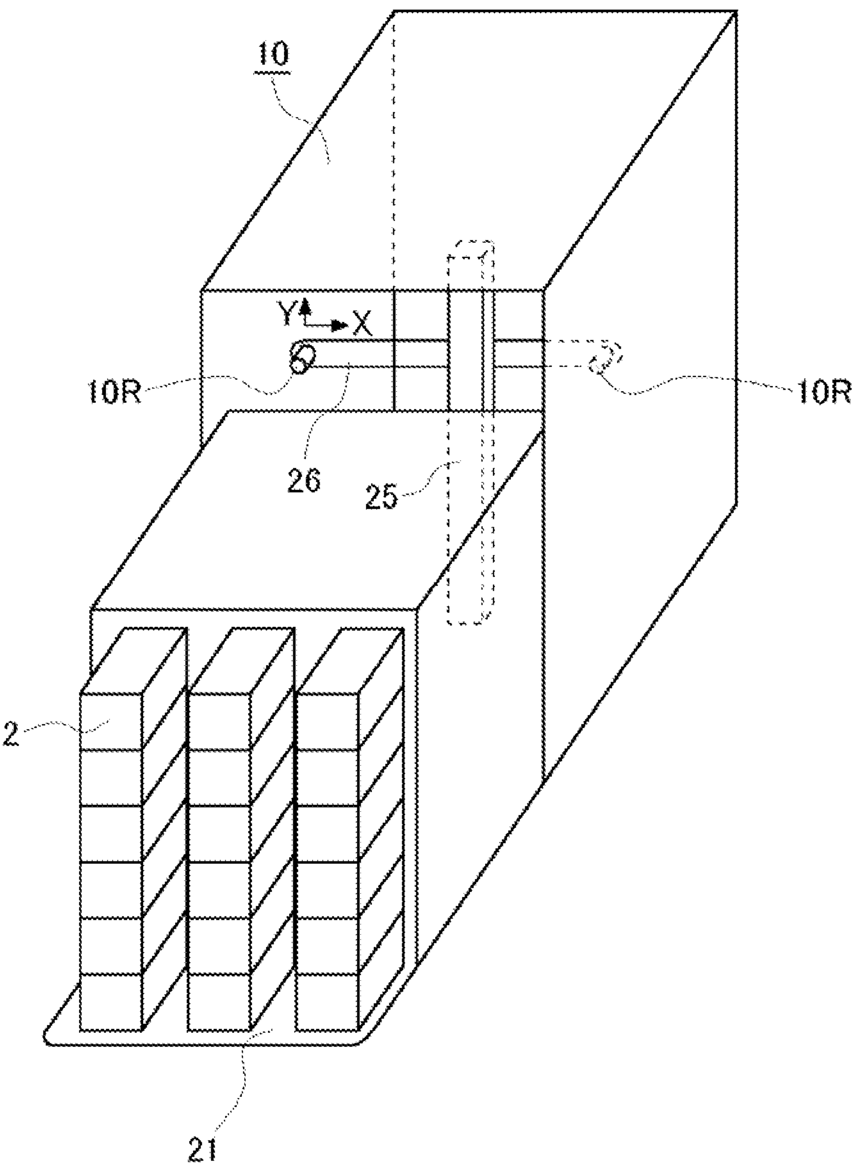
FIG. 4B is a perspective view illustrating an outline of an ID code reader in a state in which a front cover of a management/storage box according to an embodiment of the present invention is removed.

As illustrated in FIG. 4B, a plurality (a maximum of 18) of packages 2 to be used for subsequent games are stored in a package arrangement part 21 of a front side (front side when viewed from the dealer D) in the management/storage box 10. The reader 10R is installed to scan an X direction and a Y direction to read all of the ID codes 4 of all of the packages 2 by scanning mechanisms 25 and 26 installed on a rear part (back side when viewed from the dealer D) of the management/storage box 10. The reader 10R may be the monitoring camera 12 (or an RFID tag reading device or a QR code (registered trademark) reader (not illustrated in the drawings) may be used instead of the bar code reader 10R).

Figure 4C:
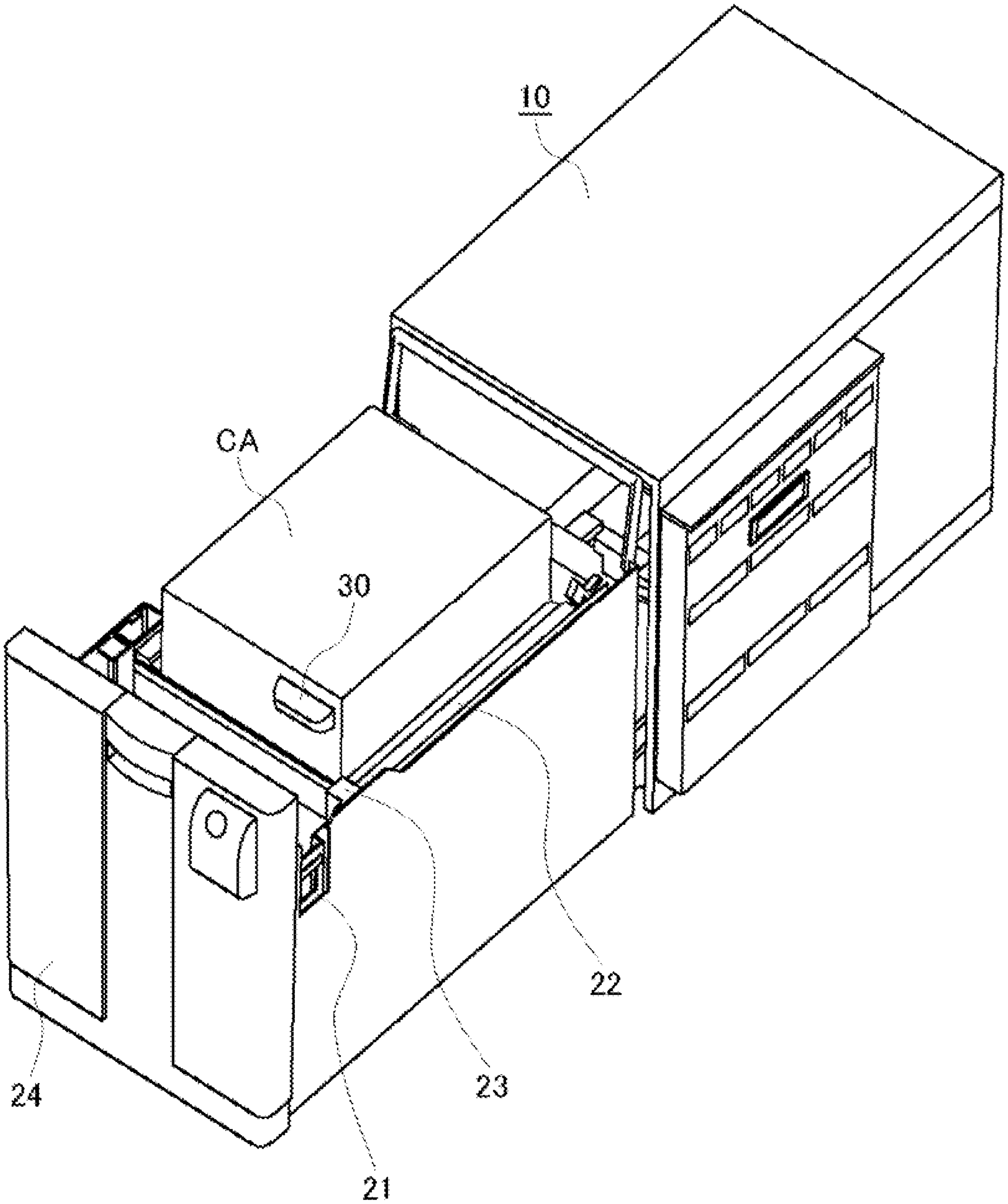
FIG. 4C is a perspective view illustrating a state in which a drawer-like front cover of a management/storage box according to an embodiment of the present invention is completely drawn and a carton is exposed.

As illustrated in FIG. 4C, an unopened carton CA containing a plurality (18) of packages 2 is stored in a carton arrangement part 22 of an upper side in the management/storage box 10. One or more (for example, two) carton ID codes 30 are attached to the carton CA and the carton ID codes 30 attached to the carton CA are read at all times or at predetermined intervals by the reader 23 existing at a front side (front side when viewed from the dealer D) and installed in the vicinity of the front side of the management/storage box 10, in a state in which the carton CA is arranged in the management/storage box 10. Here, the reader 23 may be the monitoring camera 12 (or the RFID tag reading device or the QR code (registered trademark) reader (not illustrated in the drawings) may be used instead).

As described above, all of the ID codes 4 of the packages 2 stored in the management/storage box 10 and the carton ID code 30 of the carton CA are read at all times or at predetermined intervals using the ID code readers 10R and 23 and are monitored as the ID codes 4 of the packages 2 and the carton ID code 30 before use. In addition, the readers 10R and the reader 23 may have a structure for reading the package ID codes 4 attached to all of the packages 2 stored in the management/storage box and the carton ID code 30 attached to the carton CA. The number of each of the readers 10R and the reader 23 may be any number of one or more and each of the readers 10R and the reader 23 may be provided either inside or outside the management/storage box 10.

Reading results of all of the ID codes 4 of the packages 2 carried to the management/storage box 10 and the carton ID code 30 of the carton CA are transmitted to the back yard 8 and the management control device 7 and are stored in the memory M included in the management control device 7. In the management/storage box 10, the ID codes 4 of the packages 2 are checked whenever each package 2 reaches the management/storage box 10 and whenever each package 2 is discharged from the management/storage box 10. In addition, setting may be performed such that checking is performed when the carton ID code 30 of the carton CA reaches the management/storage box 10. The management control device 7 performs confirmation at timing when it has been determined whether or not the plurality of packages 2 or cartons CA brought into the management/storage box 10 exist in the management/storage box 10 and stores a confirmation result with time using the time stamping device 7T. Reading intervals of the ID code 4 and the carton ID code 30 by the ID code readers 10R and 23 can be set widely, for example, one minute, five minutes, one hour, or longer time. Furthermore, setting can be performed such that reading is performed at constant time intervals when the door 24 of the management/storage box 10 is opened or closed. For example, setting is performed such that all of the ID codes 4 of all of the packages 2 stored in the management/storage box 10 and the carton ID code 30 of the carton CA are read in 10 seconds immediately after the door 24 of the management/storage box 10 is opened or closed. As a result, when injustice such as extraction of the packages 2 is performed, this can be grasped immediately. In addition, reading intervals can be set individually in each of the ID code 4 and the carton ID code 30. In addition, the packages 2 existing in the management/storage box 10 during a predetermined period or more can be grasped as unused products or errors. In addition, reading results can be transmitted to the back yard

8 and the management control device 7 and transmission timings thereof can be set individually in each of the ID code 4 and the carton ID code 30.

Figure 5A:
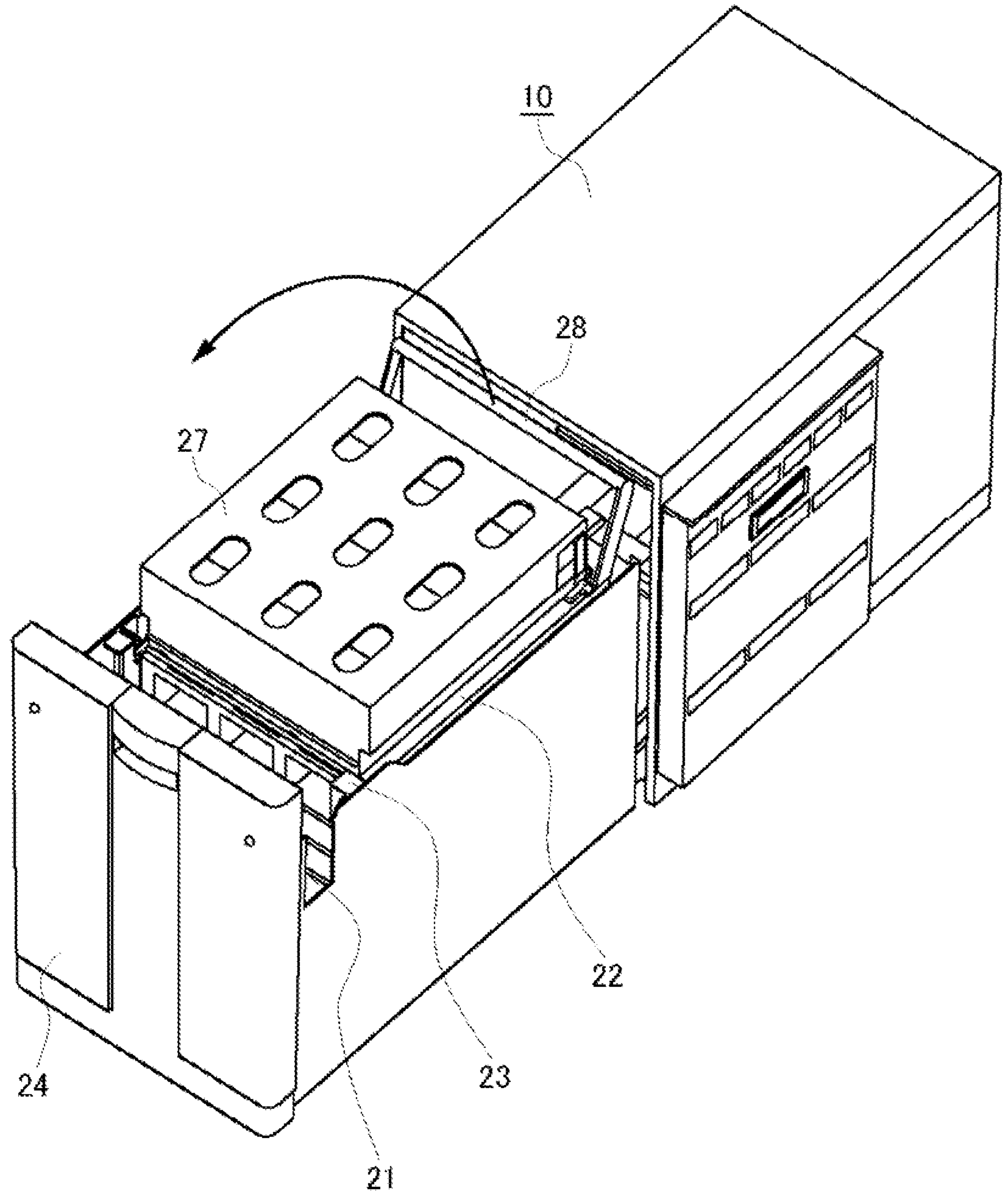
FIG. 5A is a perspective view of a state in which a carton set in a carton arrangement part of a management/storage box according to an embodiment of the present invention is unpacked, a fixation frame is fitted into an exposed package, and the package is fixed.
Figure 5B:
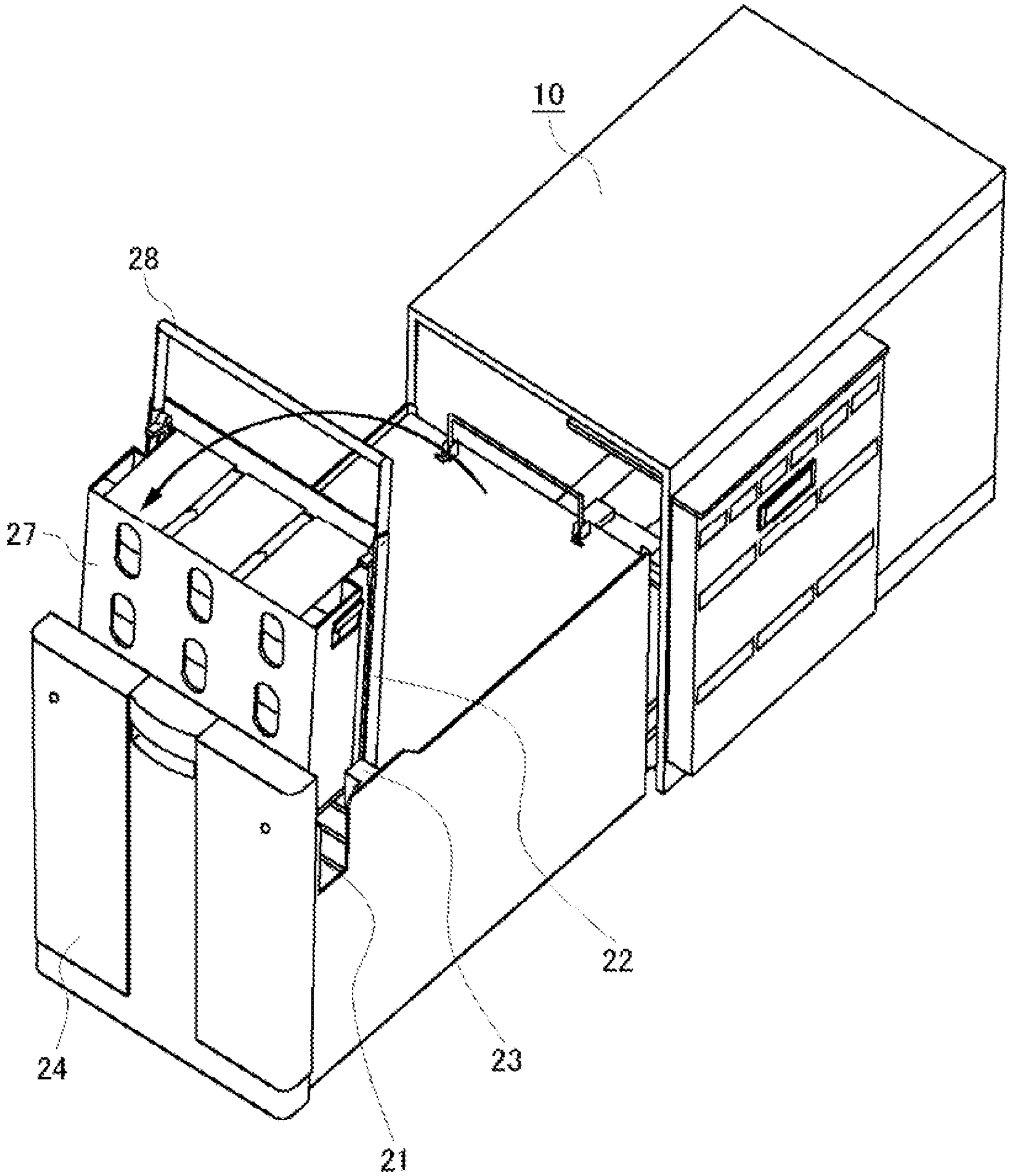
FIG. 5B is a perspective view of a state in which a package fixed on a fixation frame according to an embodiment of the present invention is lifted integrally with a carton arrangement part.

A method of accommodating the carton CA and the package 2 in the management/storage box 10 and a method of taking out the package 2 to be used for a next game from the management/storage box 10 will be described using FIGS. 5A and 5B. An unopened carton CA containing a plurality (18) of packages 2 is stored in the carton arrangement part 22 of the management/storage box 10. After all of the packages 2 at the front side in the management/storage box 10 are used, the drawer-like door 24 is further drawn and the packages 2 are exposed by performing unpacking with the entire carton CA arranged in the carton arrangement part 22 exposed. At this time, a cut line is provided in packing of the carton CA, only a bottom surface contacting the carton arrangement part 22 in the packing of the carton CA is left, and the packing is removed, so that the packages 2 can be exposed in a state of being aligned in short time. Then, a fixation frame 27 is fitted to cover all of the packages 2 and the packages 2 are fixed not to move from the carton arrangement part 22 (refer to FIG. 5A). Here, the fixation frame 27 may have any structure as long as the fixation frame 27 can fix the packages 2 on the carton arrangement part 22. For example, the fixation frame 27 may have a structure in which protrusions (not illustrated in the drawings) of the fixation frame 27 are fitted into gaps between the packages 2 to fix the packages 2. The carton arrangement part 22 has a structure in which the carton arrangement part 22 has a rotary shaft (not illustrated in the drawings) and rotates around the front side in the management/storage box 10. By gripping and lifting a gripping part 28 provided at a back side of the carton arrangement part 22, the carton arrangement part 22, the fixation frame 27, and the 18 packages 2 fixed on the fixation frame 27 are integrated with each other and are lifted to the front side (refer to FIG. 5B).

The carton arrangement part 22, the fixation frame 27, and the 18 packages 2 fixed on the fixation frame 27, which are integrally lifted to the front side of the management/storage box 10, move to a position of the package arrangement part 21 as they are. Then, the carton arrangement part 22 and the fixation frame 27 are removed from the packages 2 and the carton arrangement part 22 is lifted again, rotates, and returns to an original position. In addition, the fixation frame 27 may not be removed at this step, but may be used continuously for the purpose of fixing the packages 2 in the package arrangement part 21. By the above, work for taking out the packages 2 from the carton CA and accommodating the packages 2 in the package arrangement part 21 is completed. The accommodated packages 2 are taken out one by one from the management/storage box 10 by the dealer D and are used in the game table 11. After the accommodation of the packages 2 from the carton CA is completed or while the dealer D plays a game, the carton arrangement part 22 is replenished with a new carton CA by the dealer D or a pit manager and the carton CA is arranged in the carton arrangement part 22.

The management/storage box 10 may be configured to have the readers 10R of the same number as a maximum number of the packages 2, which are capable of being stored, in the management/storage box 10. In addition, a communication mechanism (not illustrated in the drawings) that transmits information obtained by the reader 10R and/or the reader 23 to the outside (the back yard 8 or the management control device 7) of the management/storage box 10 and exchanges information with the outside may be provided. Further, the management/storage box 10 includes a locking mechanism 31 that prevents a situation where the door 24 is opened and the package 2 and the carton CA are taken out from the management/storage box 10. The locking mechanism 31 is unlocked only while an authorized person in the casino 6 takes in or takes out the package 2 and the carton CA with respect to the management/storage box 10 or while the person accommodates the package 2 from the carton CA and the door 24 can be opened. Only the authorized person in the casino 6 can operate the locking mechanism 31 (such as an electronic lock using a password).

Further, the management/storage box 10 may include a reporting mechanism or a warning mechanism (it may be realized wirelessly and it is not shown in the drawings) to report a state in which the door 24 is opened. When it is reported that the door 24 is opened (or occasionally), images of the management/storage box 10 may be imaged by the nearest monitoring camera 12 to record taking in or taking out of the package 2 and the carton CA with respect to the management/storage box 10 by the authorized person or another person. These actions (images of the act of causing the management/storage box 10 to enter an opened state) are recorded, so that it can be confirmed whether or not the locking mechanism 31 is unlocked (the door 24 is opened) by the authorized person. In addition, these images are monitored, so that existence of all of the packages 2 and all of the cartons CA in the management/storage box 10 can be confirmed.

Next, a structure of a system on the game table 11 will be described. The package 2 of the shuffled playing cards manually taken out one by one from the management/storage box 10 by the dealer D is unpacked for use in a game (baccarat game or blackjack) later. Immediately before unpacking the package 2 (or immediately before the shuffled playing cards is are used, while the shuffled playing cards 1*s* are actually used in a game, or after the shuffled playing cards 1*s* are used), the ID code 4 of the package 2 is read from the bar code reader R of the card shooter device S to register the ID code 4 of the taken out (used, scheduled to be used, or in use) package 2 in the game table 11. The bar code reader R may be directly or indirectly connected to the card shooter device S by wire or wireless as well as the structure of being provided in the card shooter device S. The bar code reader R of the card shooter device S reads the ID code 4 of the package 2 to register the ID code 4 of the taken out (used, scheduled to be used, or in use) package 2 in the game table 11 and the ID code 4 is registered in the registration device 70. The bar code reader R may be a device connected to the card shooter device S by wire or wirelessly, that is, in this embodiment, a part of a game table management device 80, for example (refer to FIGS. 1 and 6). The ID code read from the bar code reader R is temporarily registered in the database DB as the ID code 4 of the taken out (used, scheduled to be used, or in use) package 2.

The ID code temporarily registered in the database DB as the ID code 4 is compared with the ID code 4 of the package 2 in the management/storage box 10, which is already registered in the database DB. If the ID code is matched with the stored ID code 4, the ID code is deleted from the database DB. If the ID codes are not matched, an error occurs and existence of the fake package 2 is transmitted from the management control device 7 to a management department 14 of the casino via a communication line. In addition to the case using the bar code reader R, the taken out (used, scheduled to be used, or in use) package 2 can be registered by an operation for manually registering the ID code in the registration device 70 or can be registered by the card discard device 100 to be described later. For the ID code 4 registered as the taken out (used, scheduled to be used, or in use) package 2, at least one of the following items is determined by the management control device 7, so that it is examined whether or not the package 2 exists originally in the game table 11, whether or not the package 2 arrives at regular timing or a period (not time expected originally), the package 2 is illegally mixed, or whether or not the package 2 is an irregular suspicious package. The time stamping device 7T is configured to further store time when the ID code is registered in the registration device as the ID code 4 of the taken out package 2 by the registration device 70 of the ID code.

1) Whether or not time from when the package 2 does not exist in the management/storage box 10 to when the ID code is registered in the registration device 70 as the ID code 4 of the taken out (or scheduled to be used or in use) package exceeds a predetermined time (for example, about several minutes)

2) Whether or not the ID code registered in the registration device 70 as the ID code 4 of the taken out (used, scheduled to be used, or in use) package exists in the database DB as the ID code 4 brought into the management/storage box 10

3) Whether or not the package exists in the management/storage box 10 for predetermined time (for example, about several hours) or more 4) Whether or not the ID code has been registered as the ID code 4 already taken out (used, scheduled to be used, or in use) by the registration device 70 in the past 5) Whether or not the package is carried via the predetermined delivery route 13

6) Whether or not the previous actions are not recognized

7) Whether or not the package is carried from a management/storage box 10 (unexpected management/storage box 10 not to be the management/storage box 10 of the game table 11 from which the ID code 4 of the package 2 is read or is carried not via any management/storage box 10

When mismatching with a situation programmed or set in advance occurs, an error occurs and the examination result is transmitted from the management control device 7 to the management department 14 of the casino via the communication line together with the ID code 4 in conjunction with content of a defect of the package 2.

The registration device 70 may include a device that reads an ID code of the bar code reader R attached to the card shooter device S or may include a device that is usually arranged on the game table 11 and reads the ID code of the bar code reader R scheduled to be directly or indirectly attached or connected to the card shooter device S by wire or wireless, only in the case of reading the ID code 4 of the taken out package 2 or registering the ID code 4 of the taken out package 2. Further, the registration device 70 may include a device that is connected to the card discard device 100 to receive the shuffled playing cards 1 used for the game and acquires the ID code 4 of the taken out (used, scheduled to be used, or in use) package 2 (it is described in detail later).

An output mechanism 241 or a warning mechanism (issuing an alarm) 242 to report an examination result defect is included in the card shooter device S, such that the examination result is transmitted from the management control device 7 to the card shooter device S not to use the suspicious package 2 or stop further use of the package 2. In addition, the management control device 7 may be configured to manage whether or not all of the ID codes 4 of the packages 2 registered in the database DB have been erased within a predetermined period (for example, one week or one month), whether or not the package has been authenticated as being used on any game table 11, or whether or not there is the package 2 not used in the game table 11. In addition, the management control device 7 may be configured to be connected directly or indirectly to the card shooter device S on the game table 11 and to be arranged in the game table management device 80 arranged on the game table 11.

In addition, the management control device 7 may be configured to recall images of the monitoring camera 12 after a point of time at which the suspicious package 2 is correctly authenticated in the past, when the existence of the suspicious package 2 is confirmed. For example, the management control device 7 may be configured to automatically call images in the monitoring camera 12 monitoring the management/storage box 10 and/or the game table 11 after the ID code 4 of the package 2 is finally read in the management/storage box 10, when time from when the package 2 does not exist in the management/storage box 10 to when the ID code is registered in the registration device 70 as the ID code 4 of the taken out package exceeds a predetermined time (for example, about several minutes).

Figure 6:
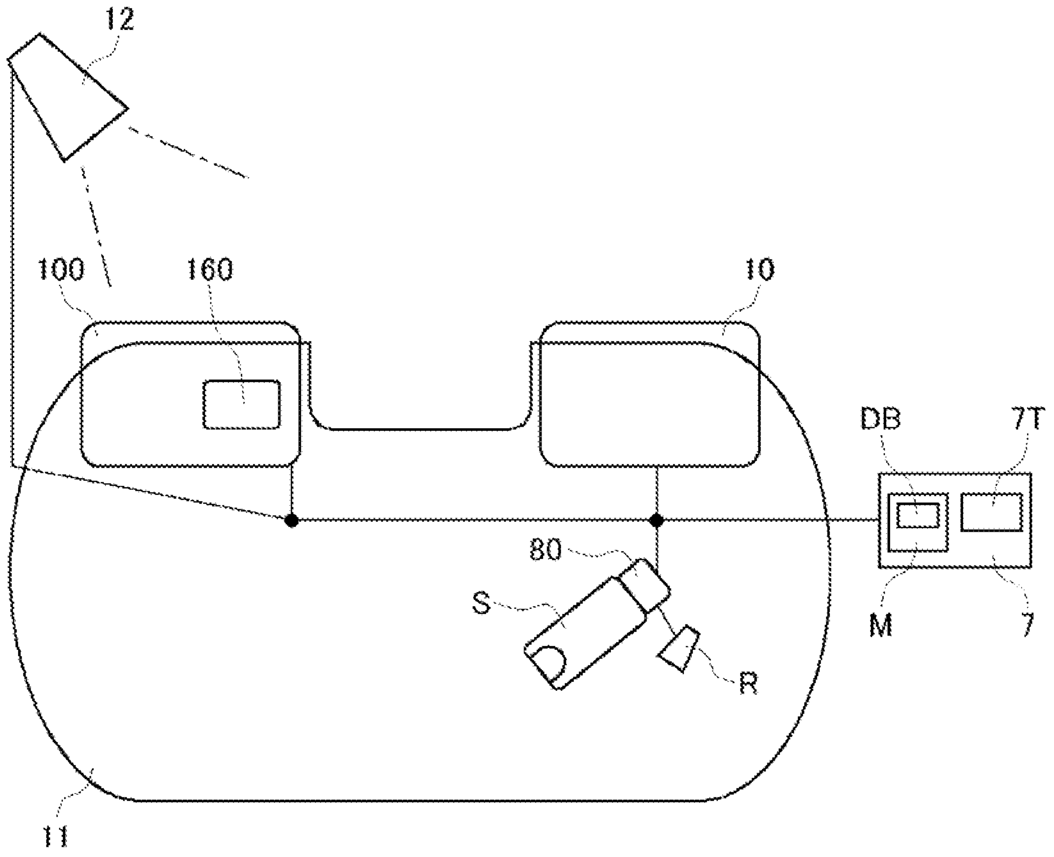
FIG. 6 is a plan view of a table, a storage box, and a card discard device according to an embodiment of the present invention.

Next, an outline of a structure of the card discard device 100 discarding the cards after use in the game in the embodiment of the present invention will be described with reference to FIG. 6. In FIG. 6, the card discard device 100 used in the management system of the table game according to the present invention is installed below the game table 11 or is arranged beside the game table 11. The game table 11 illustrated in FIG. 6 is illustrated by a simplified diagram and is used for a normal baccarat game. As well known, in the baccarat game, the game is played by a player and a banker. The card shooter device S is provided in the game table 11. The card shooter device S is a supply source of the cards 1 and the cards 1 fed from the card shooter device S are distributed to the player. After the game ends, the cards 1 are discarded by the card discard device 100. The card discard device 100 is a card discard device that discards the cards 1 stored in the card shooter device S arranged on the game table 11 and manually distributed by the dealer on the game table 11, after use in the game. The card discard device 100 discards sets (normally, 6, 8, or 12 decks) of the cards 1 configuring the plurality of decks stored in the card shooter device S and collected cards 1*a*.

Figure 10:
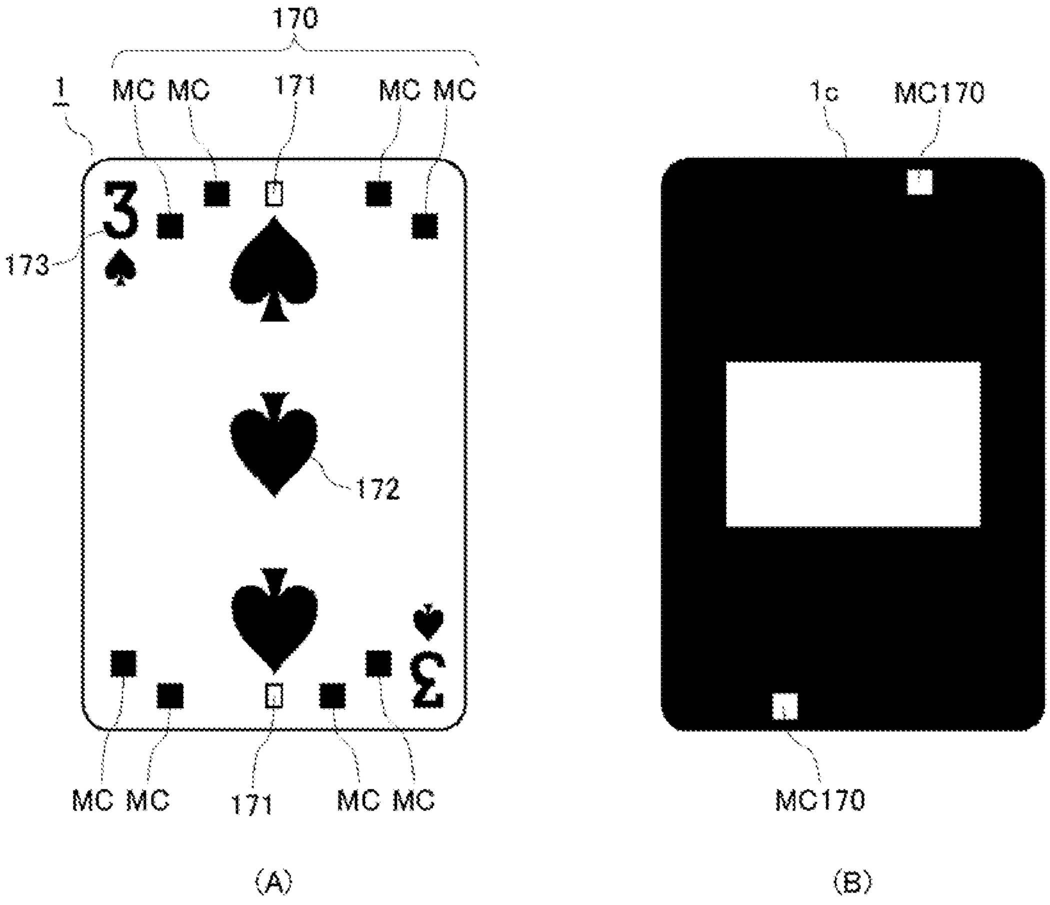
FIG. 10 is a plan view of a card and a cut card according to an embodiment of the present invention.
Figure 12:
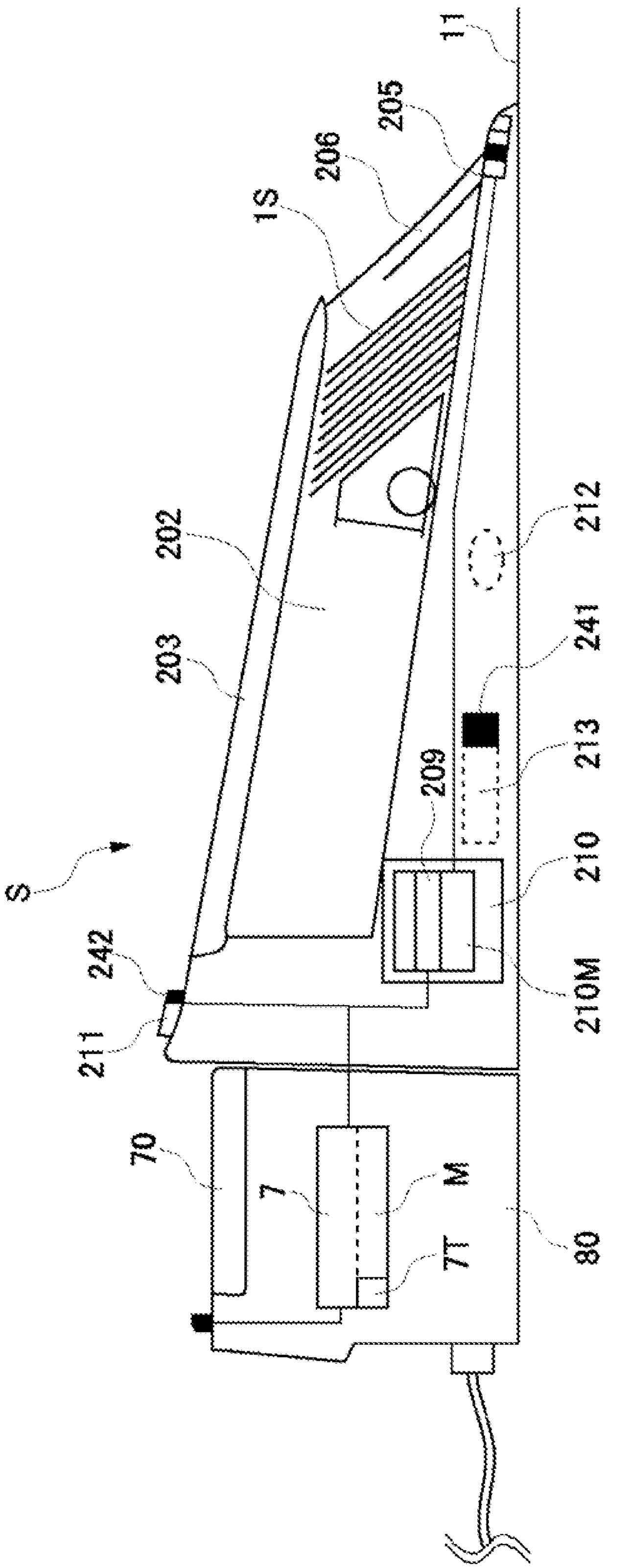
FIG. 12 is a lateral cross-sectional view of a card shooter device according to an embodiment of the present invention.

A cut card 1*c* is inserted into a set is of the cards 1 before the set is of the cards 1 are set in the card shooter device S of the game table 11 (refer to FIG. 10). The cut card 1*c* is inserted into the latter half (the remainder is about ¼ or ⅕) of the set 1*s* of the cards 1 when the set 1*s* of the cards 1 is used for the game and prevents the player from counting the ranks of the individual cards distributed during the game to predict the ranks of the remaining few cards. Therefore, the cut card 1*c* is used to end the game of the game table 11 with about 20 to 40 cards 1 left in the card shooter device S (refer to FIGS. 1 and 10).

Next, the structure of the card discard device 100 will be described in detail using FIG. 7. The card discard device 100 has a structure in which the cards 1*a* used for each game and collected are sequentially received and all cards 1*r* left in the card shooter device S without being used can be received at predetermined timing (when the game is stopped after a next game or 2 to 3 games end from drawing of the cut card 1*c*) after the cut card 1*c* is discharged from the card shooter device S. The card discard device 100 counts a total sum of the sheet number of cards 1*a* after being used for each game and the number of cards 1*r* left in the card shooter device S without being used after the cut card 1*c* is discharged from the card shooter device S and determines whether or not all of the discarded cards are aligned by the sheet number corresponding to the predetermined number of decks, by a deck inspection mechanism 113 to be described later. A sheet number counter (not illustrated in the drawings) is provided in the card shooter device S and/or the management control device 7 or is provided to be connected to the card shooter device S and/or the management control device 7 by wire or wireless and the sheet number counter is configured to count the sheet number of shuffled playing cards fed from the card shooter device S to the game table. As described later, information of the ranks and the suits of the shuffled playing cards 1 fed from the card shooter device S to the game table is read by the card shooter device S and is transmitted to the game table management device 80 and/or the management control device 7 connected to the card shooter device S by wire or wireless.

The cards 1 used for the game are inserted into a discharge port 101 of the card discard device 100 and are discarded. The card discard device 100 has a configuration including a discard card reception base 102 to receive the cards 1*a* to be discarded from the discharge port 101, a discard card information acquisition mechanism 106 to acquire information of numbers (ranks) and types (suits) from the cards 1*a* inserted into the discharge port 101, a group information acquisition mechanism 107 to acquire group information (information for specifying a casino in which the card is used) from the cards 1*a* to be discarded, a sheet number counter 108 of the cards functioning as a sheet number measurement mechanism to count the sheet number of cards 1*a* inserted into the discharge port 101 and discarded, an authenticity determination mechanism 109 to compare the group information of the cards obtained from the group information acquisition mechanism 107 with predetermined group information and determine whether or not the group information of the cards is matched with the predetermined group information, and an output mechanism 110 to output a determination result of the determination mechanism. The card discard device 100 includes the deck inspection mechanism 113 to integrate the information obtained from the discard card information acquisition mechanism 106 and the information of the sheet number counter 108 to measure the sheet number of cards at least every number (rank) of the cards 1 and determine whether or not the number of cards 1 inserted into the discharge port 101 is aligned by the predetermined sheet number. The card discard device 100 includes a control device 114 to control a whole operation and the individual mechanisms are arranged in the control device 114 to control individual operations. The control device 114 is composed of an electronic circuit including a microcomputer and a memory and has a normal computer configuration such as a CPU, a ROM, and a RAM. The control device 114 executes a program stored in a memory other than the ROM, thereby controlling the entire device and performing necessary processing.

Further, the card discard device 100 will be described in detail. After use in the game, the cards 1 are inserted into the discharge port 101 and are discarded. A weight 156 is arranged on the discard card reception base 102 to receive the cards 1 to be discarded. The weight 156 is provided to help the cards 1 to be pressed against the discard card reception base 102 to feed the cards 1 to a feeding roller 115 surely, even when the cards 1 to be discarded are bent during the game, and is configured to press downward the front and rear of the cards 1 by weight rollers 157 and 158. The weight 156 receives the cards 1 in the discharge port 101 as illustrated in FIG. 7B. However, the weight 156 has a structure capable of moving upward such that the cards 1 are received even in a bundle state.

The feeding roller 115 is provided below the discard card reception base 102 to feed the discarded cards 1 manually loaded on the discard card reception base 102 one by one. The feeding roller 115 is rotationally driven by a drive motor 116. The drive motor 116 uses a stepping motor. When the cards 1 are loaded on the discard card reception base 102, a card sensor 117 detects this, the control device 114 controls the drive motor 116, and the feeding roller 115 rotates. In this way, the cards 1 on the discard card reception base 102 are fed by the feeding roller 115. Further, the cards 1 fed from the feeding roller 115 are delivered to a temporary storage stocker 119*f* (arrow D1) by a pair of delivery rollers 118*a*. A drive speed is set such that the delivery roller 118*a* is driven and controlled by a delivery motor 116*a* and delivers the cards 1 at a speed faster than the speed of the cards 1 delivered from the feeding roller 115. For this reason, the cards 1 are drawn by the delivery roller 118 and are surely delivered to the temporary storage stocker 119*f* (arrow D1). The delivered cards 1 pass through a group information acquisition sensor 120 and two card information acquisition sensors 121 in the middle of delivering. Here, information of the cards 1 is detected and acquired.

The group information acquisition sensor 120 is connected to the group information acquisition mechanism 107 to acquire group information from the cards 1. In addition, the card information acquisition sensor 121 is connected to the discard card information acquisition mechanism 106 to acquire information of the number (rank) from the card 1 and the information of the number (rank) is acquired. The card 1 delivered to the temporary storage stocker 119*f* is detected by the sheet number counter 108 connected to the card sensor 117 and the sheet number of cards 1 passing therethrough is counted. The signal of the group information acquisition sensor 120 is transmitted to the group information acquisition mechanism 107, the group information of the cards 1 obtained by the group information acquisition mechanism 107 is compared with the predetermined group information stored in advance by the authenticity determination mechanism 109, and it is determined whether or not the group information of the cards 1 is matched with the predetermined group information. When the group information of the cards 1 is not matched with the predetermined group information, the authenticity determination mechanism 109 determines that the cards are fake cards and the control device 114 turns on a display lamp 122 through the output mechanism 110 outputting a determination result and transmits existence of the fake cards to the management department 14 of the casino via a communication line 114L.

When the card 1 is delivered to the temporary storage stocker 119*f*, information is acquired by the group information acquisition sensor 120 and the card information acquisition sensor 121, and a void hole or a slit to prevent the card 1 from being used in the future is formed in the card 1 by a void mechanism (not illustrated in the drawings). For this reason, the card 1 delivered to the temporary storage stocker 119*f* passes through the void mechanism. When it is determined by the authenticity determination mechanism 109 that the card 1 is a fake card, information thereof is transmitted to the void mechanism by the control device 114 and a special void hole or slit (both are not illustrated in the drawings) indicating that the card 1 is defective is formed. The card 1 determined by the authenticity determination mechanism 109 is delivered to the temporary storage stocker 119*f* through a gap. The card 1 delivered to the temporary storage stocker 119*f* is configured to be drawn by opening and closing a cover 119*fo* (not illustrated in the drawings) provided in an upper part of the temporary storage stocker 119*f*. As a result, for example, even when a reading result is an error, it is possible to open the cover 119*fo* and draw and confirm an actual card.

The void mechanism forms the void hole or slit in the card 1 by a punching mechanism (punch and die). A discard card 1*h* provided with the void hole is temporarily stored in the temporary storage stocker 119*f*. In the configuration of this embodiment, the void hole is formed by the void mechanism. However, a notch may be provided at a corner of the card 1, a void mark may be given by a known stamp or a printing mechanism using a laser, or a slit may be formed in the card. As a result, a void hole or a void mark is provided in the card such that the card cannot be reused after discarding processing and checking, thereby completely preventing unjust reuse of the card. This timing is not limited and may be timing before and after reading the card or the same timing as the reading.

The delivered card 1*h* is temporarily stored in the temporary storage stocker 119*f*. In addition, a communication part 114C of the control device 114 is configured to receive the numbers (ranks) or the suits of shuffled playing cards 1 fed from the card shooter device S to the game table and information or group information on the sheet number from the card shooter device S and/or the game table management device 80 and/or the management control device 7 connected to the card shooter device S by wire or wirelessly. In addition, it is determined by the deck inspection mechanism 113 of the control device 114 whether or not the information of the shuffled playing cards 1 received by the communication part 114C and the numbers (ranks) or the suits of shuffled playing cards 1 acquired in the middle of delivering and the information or the group information on the sheet number are matched. When the information is matched, a delivery roller 118*b* is driven and controlled by a delivery motor 116*b* and the card 1*h* temporarily stored in the temporary storage stocker 119*f* is delivered in a direction (arrow D2) of a discard card stocker 119. A temporary storage step preferably progresses the game while being executed for each baccarat game (it is possible to proceed to a next game after executing processing until the dealer D places the cards 1*a* for one game on the discharge port 101 and the cards 1*a* are dropped into the discard card stocker 119, whenever one game ends). Temporary storage interval can be freely set in the control device 114. Further, an external input device (not illustrated in the drawings) can be used as timing at which the card 1*a* is delivered from the discharge port 101 to the temporary storage stocker 119*f* and timing at which the card 1*h* is delivered from the temporary storage stocker 119*f* to the discard card stocker 119. For example, setting can be performed such that the cards 1 are dropped into the discard card stocker 119 by pressing a button.

Next, the deck inspection mechanism 113 will be described in detail. Cards of a plurality of decks (4, 6, or 8 decks) are normally set in the card shooter device S (electronic shoe) loaded on the game table 11. The set 1*s* of cards is provided in a state (package 2) in which the shuffled cards of the plurality of decks are packed and a different bar code 3 is provided in each package 2 (refer to FIG. 1). ID information specifying the individual set is of cards is read from the bar code 3 by the bar code reader R arranged on the game table 11 and the set is of the cards used for the game is specified from the ID information. In addition, the set is of the cards is set in the card shooter device S and is provided for each game. The set is of the cards set in the card shooter device S is not used entirely. At the beginning of all games, the cut card (refer to FIG. 1.1*c*) is inserted into the set 1*s* of cards of the plurality of decks (4, 6, or 8 decks) for game security. If the cut card 1*c* appears, the remaining cards 1*r* in the card shooter device S are not used anymore. All of the remaining cards 1*r* are inserted into the discharge port 101 for discarding.

All of the remaining cards 1*r* are inserted into the discharge port 101 for discarding and information of the numbers (ranks) is acquired from the remaining cards 1*r* by the discard card information acquisition mechanism 106. The deck inspection mechanism 113 integrates a combination of the information of the numbers (ranks) obtained from the remaining cards 1*r* by the discard card information acquisition mechanism 106 and the information of at least the number (rank) obtained from each card 1*a* already used for each game and the information of the sheet number counter 108 of the cards functioning as the sheet number measurement mechanism, measures the sheet number of cards every number (rank) of the cards, and determines whether or not the cards are aligned by the sheet number corresponding to the predetermined deck number every number (rank) for all of the cards loaded on the game table and inserted into the discharge port 101 (416 sheets from Ace to King (example: 4 types×8 decks)).

The total sheet number of cards 1 used in the table game is determined in advance in the casino (normally, 4, 6, 8, 10, or 12 decks). For example, in the case of 8 decks, eight sheets of cards of the same suit and the same rank are used in the cards 1 of 416 sheets of 52 sheets×8 decks. In the deck inspection mechanism 113, it is determined whether or not the cards are aligned by each sheet number by the control device 114, the display lamp 122 is turned on with a different color according to a result by the output mechanism 110 outputting the result, and a counting result of the cards 1 is transmitted to the management department 14 of the casino by the communication mechanism 114L as the same time. In this way, it is confirmed by the deck inspection mechanism 113 that the 416 sheets of cards are aligned.

If use of the sets (for example, 8 decks) of cards 1*h* entering the card shooter device S ends, all of the sets of cards are stored in the discard card stocker 119 as described above. Then, the bar code 3 attached to the package 2 containing the set 1*s* of the cards can be separated to specify the set is of the cards entering the discard card stocker 119 and can be inserted into the discard card stocker 119 (the discard card stocker 119 can be configured such that a cover 1190 of an upper part of the discard card stocker 119 can be opened and closed and the bar code 3 can be inserted. Before use of the cards 1 of the card shooter device S ends and use of a package 2 included in a new carton CA starts or before the used cards 1*a* are first inserted into the card discard device 100, the bar code 3 is preferably inserted). In this case, not only the bar code 3 but also the package 2 may be inserted into the discard card stocker 119. If the package 2 and the bar code 3 are inserted into the same discard card stocker 119, there is no waste around the table of the casino and there is an advantage in arrangement. The package 2 and the bar code 3 enter the discard card stocker 119 through a slit (not illustrated in the drawings) formed in the cover 1190 for drawing. The cover 1190 for the drawing may have a structure in which the cover is opened upward by unlocking and the package 2 and the bar code 3 may enter the discard card stocker 119 through the slit (not illustrated in the drawings). In this way, use of the sets (for example, 8 decks) of cards entering the card shooter device S ends, all of the sets of cards are stored in the discard card stocker 119, and the bar code 3 used to specify the set is of the cards also enters the same discard card stocker 119. Instead of inserting the bar code 3, the bar code 3 may be read by the bar code reader R provided on the back side of a door 161 of a cabinet for discard.

All of the sets (for example, 8 decks) of the cards entering the card shooter device S are stored in the discard card stocker 119 and the bar code 3 enters the discard card stocker 119. As a result, all of the sets (for example, 8 decks) of the cards including the discard cards 1*h* and the bar code 3 are deposited on a cover 162 of a top surface of the cabinet 161 for the discard (to be described later) below the card discard device 100 (refer to FIG. 7B). The discard card stocker 119 is sized to be able to sequentially receive the discard cards 1*h* distributed from the card shooter device S, used for the game, and collected. When the game is stopped at predetermined timing, all of the cards 1*r* remaining in the card shooter device S and the bar code 3 can enter the discard card stocker 119.

When it is confirmed that the 416 sheets of cards are aligned by the deck inspection mechanism 113 of the card discard device 100, the dealer D opens the cover 162 of the top surface of the cabinet 161 for the discard (refer to FIG. 7B), so that all of the sets (for example, 8 decks) of cards including the discard cards 1*h* and the bar code 3 are moved (dropped) to the inside through a hole 163*o* formed in an upper part of a discard card box 163*a* arranged in the cabinet 161 for the discard. The cover 162 of the top surface may be opened and closed by controlling an electric cylinder by a control device included in the cabinet 161 for the discard. As timing at which the dealer D opens the cover 162 of the top surface of the cabinet 161 for the discard, an external input device (not illustrated in the drawings) can be used. For example, the cards can be moved to the discard card box 163*a* by opening the cover 162 by pressing the button.

Figure 8:
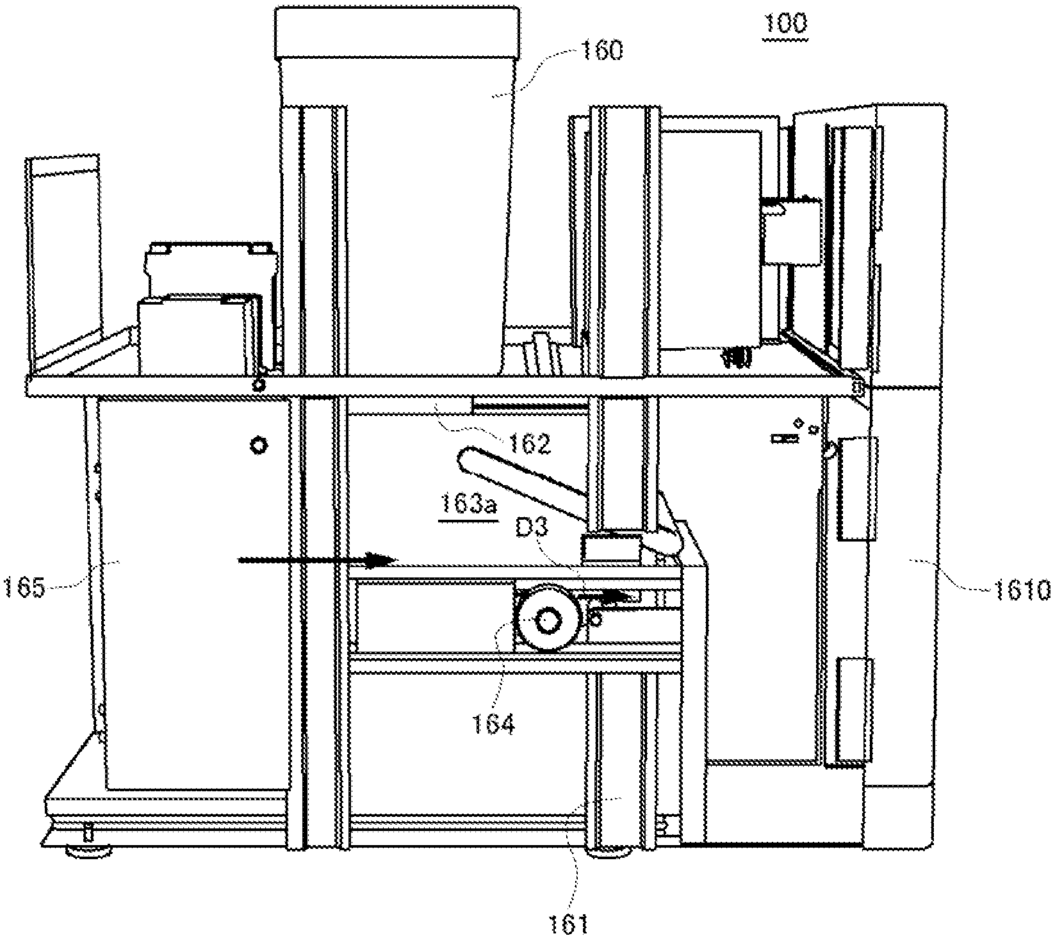
FIG. 8 is a lateral cross-sectional view of a body and a cabinet for discard in a card discard device of a management system of a table game according to an embodiment of the present invention.

Meanwhile, when it is confirmed by the deck inspection mechanism 113 that the 416 sheets of cards are not aligned, all of the sets (for example, 8 decks) of cards including the discard cards 1*h* and the bar code 3 are deposited on the cover 162 of the top surface in a state in which the cabinet 161 for the discard is closed. At this time, a lever 164 provided on a side of the card discard device 100 is pulled in a direction of the front side D3 (refer to FIG. 8) by the dealer D, so that the discard card box 163*a* located below the discard card stocker 119 of a body 160 moves to the front side and an NG discard card box 165 located at the back of the discard card box 163*a* moves to be located below the discard card stocker 119 at the same time. Likewise, the dealer D opens the cover 162 of the top surface of the cabinet 161 for the discard, so that the cards 1*h* are moved (dropped) to the inside through a hole 165*o* formed in an upper part of the NG discard card box 165. Then, after returning the lever 164 to an original position to return the NG discard card box 165 to an original position, a door (not illustrated in the drawings) provided in the side of the card discard device 100 is opened and only the NG discard card box 165 is drawn. In addition, the door is configured to be locked.

As another embodiment, when it is confirmed by the deck inspection mechanism 113 that the 416 sheets of cards are not aligned and the sets (for example, 8 decks) of the cards including the cards 1*h* are deposited on the cover 162 of the top surface, the cover 1190 for the drawing provided in the upper part of the discard card stocker 119 of the body of the card discard device 100 is opened and all of the sets (for example, 8 decks) of cards including the discard cards 1*h* and the bar code 3 can be drawn upward. As a result, the actual cards can be quickly confirmed. The control device 114 controls an injustice prevention device (not illustrated in the drawings) such that only a worker with authority can open the cover 1190 using a key. As a result, unjust drawing of the discard card 1*h* from the discard card stocker 119 can be prevented.

When it is confirmed by the deck inspection mechanism 113 that the 416 sheets of cards are not aligned or when it is confirmed that the information of the shuffled playing cards 1 drawn from the card shooter device S, received by the communication part 114C, and the numbers (ranks) or the suits of the shuffled playing cards 1 acquired by the card discard device 100 and the information or the group information on the sheet number are not matched, images of the monitoring camera 12 having captured the suspicious situation may be called. For example, the images of the monitoring camera 12 monitoring the game table 11 and/or the card discard device 100 after a point of time when the information of the shuffled playing card 1 finally drawn from the card shooter device S and the information acquired by the card discard device 100 are matched may be automatically called.

Figure 7A:
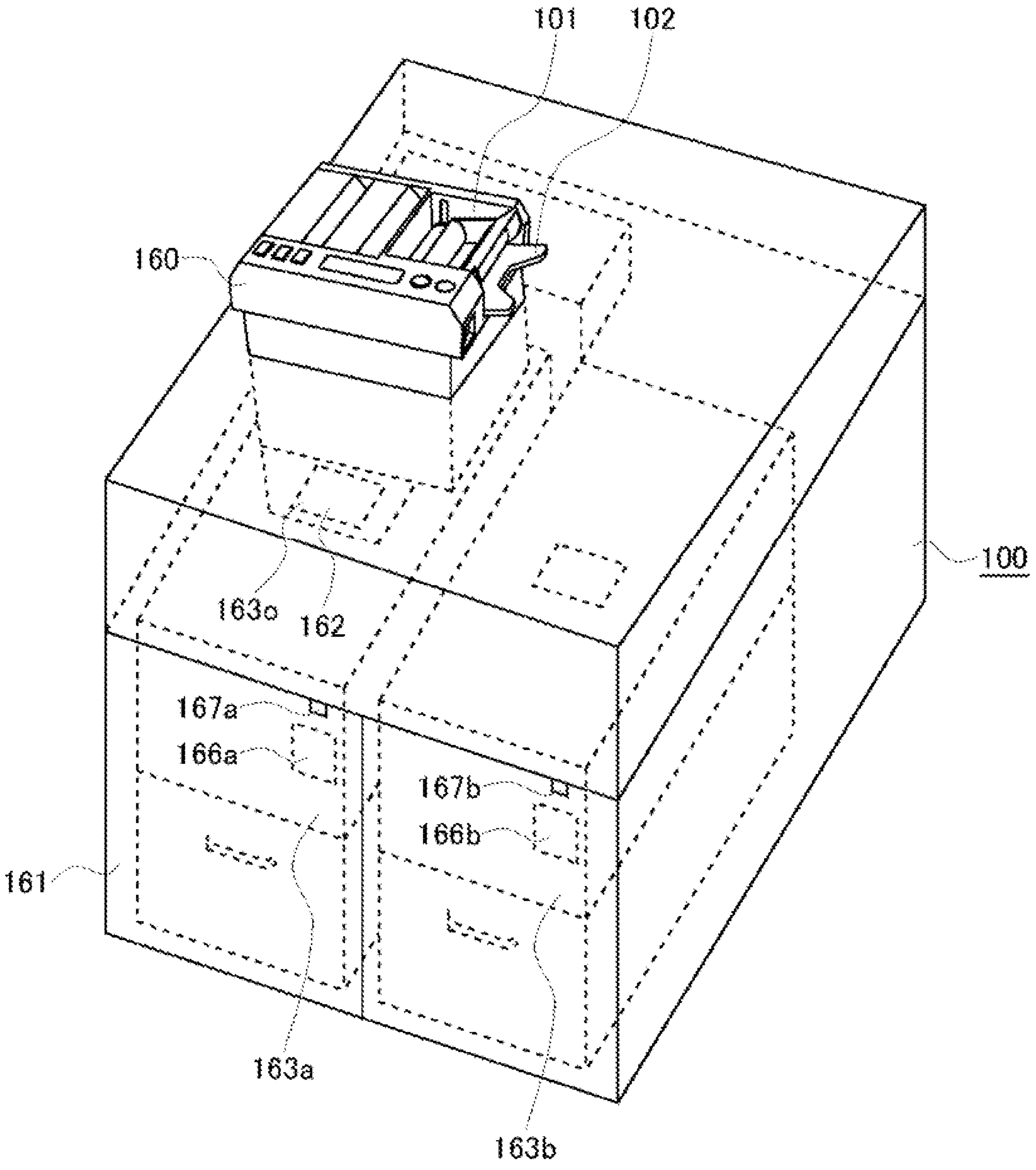
FIG. 7A is a perspective view of a body and a cabinet for discard in a card discard device of a management system of a table game according to an embodiment of the present invention.
Figure 7B:
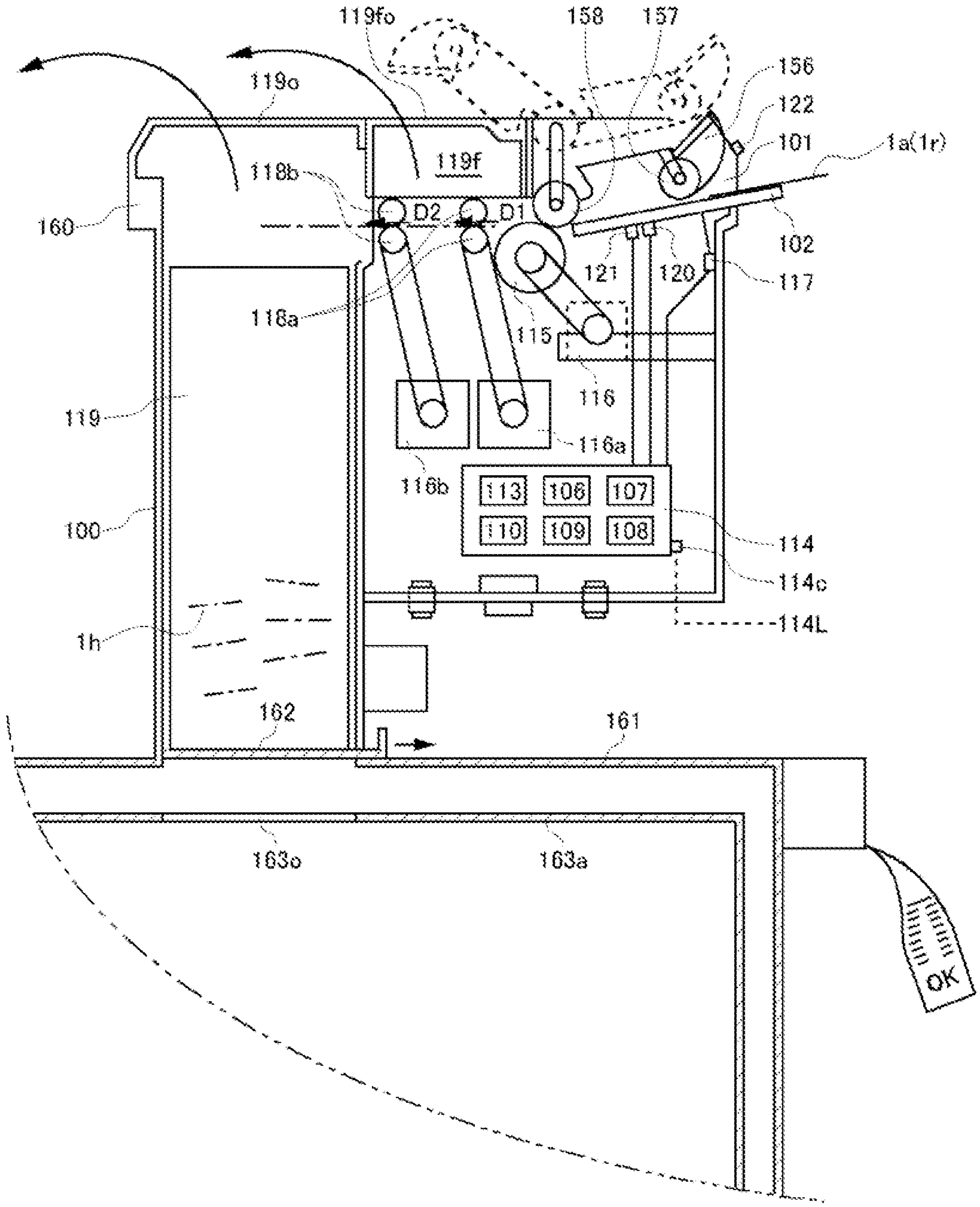
FIG. 7B is a cross-sectional view of a body and a cabinet for discard in a card discard device of a management system of a table game according to an embodiment of the present invention.
Figure 9:
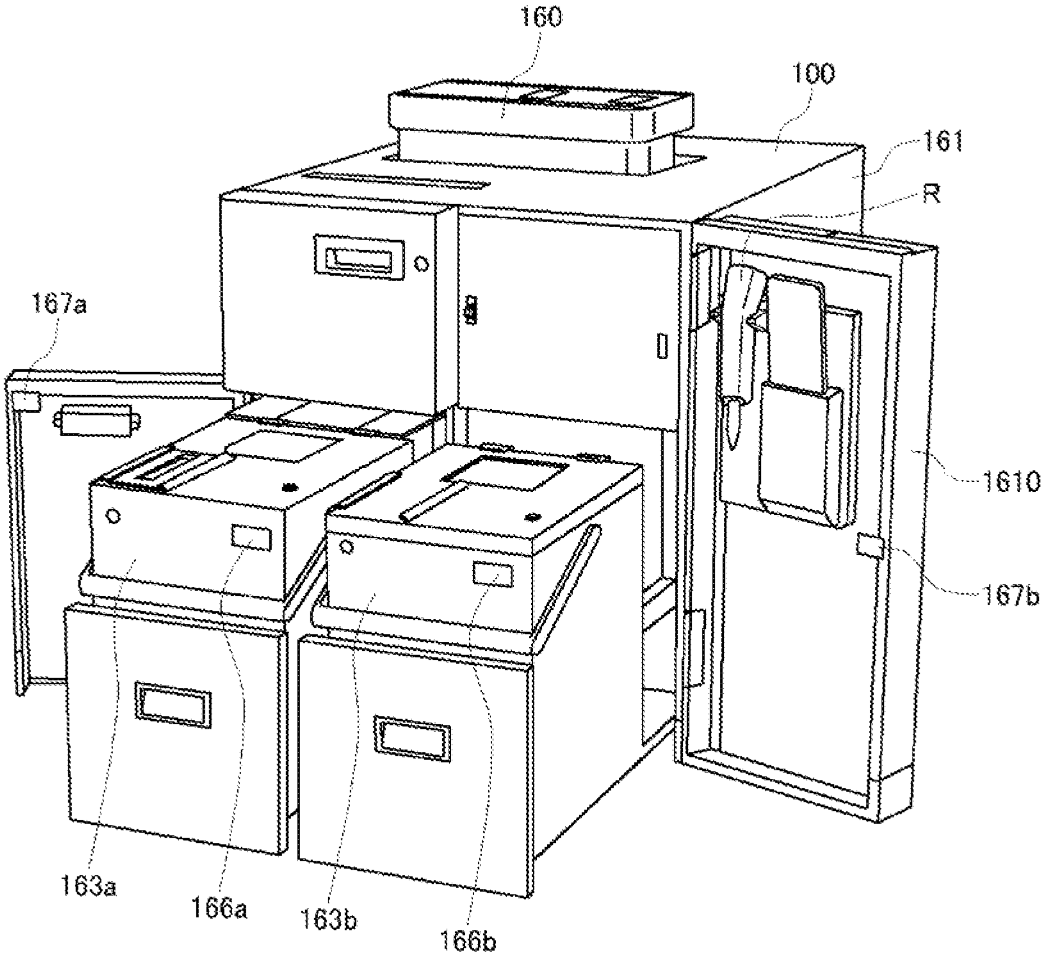
FIG. 9 is a perspective view illustrating a state in which a discard card box is drawn from a card discard device of a management system of a table game according to an embodiment of the present invention.

As illustrated in FIG. 7A, two discard card boxes 163*a* and 163*b* are stored in the cabinet 161 for the discard and discard card box IDs 166*a* and 166*b* to specify the individual discard card boxes 163*a* and 163*b* are attached. In addition, reading is enabled at all times by ID code readers 167*a* and 167*b* provided at a back side of a front door 1610 of the card discard device 100. In each of the discard card box IDs 166*a* and 166*b*, the cards 1 contained in a plurality (9) of packages 2 can be stored and the cards 1 of the 18 packages contained in one carton CA supplied to the management/storage box 10 can be stored and discarded by the two discard card boxes 163*a* and 163*b*. When the cartons CA are supplied to the management/storage box 10, a plurality of carton ID codes 30 attached to the cartons CA are taken and are each attached to the discard card boxes 163*a* and 163*b* as the discard card box IDs 166*a* and 166*b* and it is possible to accurately grasp which carton CA the cards 1 discarded in the discard card boxes 163*a* and 163*b* corresponds to. Reading timings of the discard card box IDs 166*a* and 166*b* by the ID code readers 167*a* and 167*b* are configured to be freely set using the control device 114 and setting can be performed to perform reading when the front door 1610 of the card discard device 100 is opened and the discard card boxes 163*a* and 163*b* are carried or when positions thereof are moved. After the cards 1*h* contained in the plurality (9) of packages 2 are discarded in the discard card box 163*a*, the hole 163*o* of the upper part of the discard card box 163*a* is closed (a slide-type cover (not illustrated in the drawings) is configured to be automatically or manually closed), the front door 1610 of the card discard device 100 is opened, and the discard card box is carried to a discard place. At this time, the discard card box 163*b* is arranged below the body 160 of the card discard device 100 and a new card 1*h* is dropped into the discard card box 163*b* and is discarded. Further, the card discard device 100 is replenished with a new empty discard card box by the dealer D or the pit manager and the new empty discard card box is arranged (refer to FIG. 9).

Next, the cards 1 used for the table game in the embodiment of the present invention will be described using FIG. 10. In the card 1, codes 170 in which the number of the card 1 is encoded and which are composed of marks MC normally invisible are provided on an upper side and a lower side of the card 1 in point symmetry. The code 170 is composed of a combination of the number and the arrangement of a plurality of marks MC printed with infrared reaction ink or ultraviolet reaction ink invisible under daylight. In addition, the card 1 is provided with group code information 171 used as an authenticity determination code arranged by printing in a state (for example, ultraviolet reaction ink) in which information representing authenticity of the card is encoded and is normally invisible. The code 170 and the group code information 171 are arranged in at least two places of the card 1 and are arranged at point symmetry positions with respect to the center of the card 1.

The codes 170 are read by the two card information acquisition sensors 121 configuring the card information acquisition sensor 121. The card information acquisition sensor 121 is configured to output an output signal when the marks MC are detected (a known ultraviolet reaction light sensor is used). A relation of outputs of ON signals of the two UV sensors (outputs of electric signals when the codes 170 composed of the marks MC are read) and the marks MC is illustrated in FIG. 11. A predetermined combination of the marks MC can be specified on the basis of a comparison result of relative changes in the outputs of the ON signals of the two UV sensors for the codes 170 composed of the marks MC. As a result, in the embodiment illustrated in FIG. 11, if four types as combinations of marks MC of upper and lower two rows are printed in four rows, 256 types of codes can be configured by the fourth power of the fourth types. 52 types of cards of playing cards are allocated to any one of 256 types of codes, this is stored in a memory or a program as a comparison table, and the discard card information acquisition mechanism 106 can specify at least the numbers (ranks) of cards 1 from a predetermined comparison table (not illustrated in the drawings) by specifying the individual codes 170. Preferably, the codes 170 are printed with paint visualized by receiving ultraviolet light and are printed at positions not overlapping a type notation 172 and an index 173 of the card 1. In addition, a blank part is provided between the code 170 and the group code information 171 and the end of the card 1. In addition, the group code information 171 may be printed together with the ink representing the group code information in the code 170 at the same place. The code 170 composed of the marks MC indicating the cut card 1C can be printed in the cut card 1C and the cut card 1C can be specified in the same way.

Next, the authenticity determination mechanism 109 to determine the authenticity of the card 1 from the information on the authenticity of the card 1 will be described. In the card 1 to be an authenticity inspection target, as described above, group code information 171 functioning as group information configured in a state (for example, ultraviolet reaction ink) in which information indicating the authenticity of the card 1 is encoded and is normally invisible is provided. The group code information 171 is made of a substance or a material (for example, ink or paint) emitting light of a spectrum of a different wavelength for light of a different wavelength as a code. The authenticity determination mechanism 109 includes a function of emitting light of a different wavelength to be invisible to the group code information 171 by the group information acquisition sensor 120, receiving light at two or more different wavelengths of light emitted from the group code information 171, determining whether or not a ratio of strengths of the light is the same by the authenticity determination mechanism 109, and performing authenticity determination of the card 1. Light of two or more wavelengths to be more complicated may be analyzed by receiving the light of the different wavelength spectrums.

When the group code information 171 is read, the group information acquisition sensor 120 emits two kinds of ultraviolet rays to radiate the ultraviolet rays to the group code information 171 printed on the card 1 and light of different wavelength spectrums emitted from the group code information 171 Is received by the group information acquisition sensor 120. The control device 114 including the authenticity determination mechanism 109 is composed of an electronic circuit including a microcomputer and a memory, has a normal computer configuration such as a CPU, a ROM, and a RAM, and executes processing for determining the authenticity of the group code information 171.

Finally, contents to be managed by the management control device 7 will be described.

1) All of the ID codes 4 of the packages 2 carried to the back yard 8 are registered in the database DB (stored in the memory M of the database DB connected to the management control device 7). To register all of the ID codes of the packages 2 supplied to the casino 6, instead of reading all of the bar codes 3 of the packages or reading the ID codes 4 by the camera 12 or the RFID tag reading device (not illustrated in the drawings), data from a factory, the carton ID code 30, or the pallet ID code PA-ID can be used. Instead of the bar code reader R, a two-dimensional code reader such as a QR code (registered trademark) reader can be used in the embodiment of the present invention.

2) For the purpose of storing the shuffled playing cards used in the table game in units of the packages 2 or units of the cartons CA, the individual ID codes 4 of the packages 2 of all of the shuffled playing cards existing in the management/storage box 10 are acquired by the ID code reader 10R and the carton ID codes 30 of the cartons CA are acquired by the ID code reader 23 (the monitoring camera 12 or other reading device can be used), so that all of the ID codes 4 of the packages 2 carried to the management/storage box 10 and the carton ID codes 30 of the cartons CA are read and the individual ID codes 4 of the packages 2 of all of the shuffled playing cards existing in the management/storage box 10 and the carton ID codes 30 of the cartons CA are monitored. Reading results of all of the ID codes 4 of the packages 2 carried to the management/storage box 10 and the carton ID codes 30 of the cartons CA are transmitted to the back yard 8 and the management control device 7 and are registered in the database DB connected to the management control device 7 and stored in the memory M. In addition, the management control device 7 has the time stamping device 7T that reads the ID codes 4 of the plurality of packages brought into the management/storage box 10 at the predetermined time intervals, confirms the existence of each ID code 4 registered in the database DB in the management/storage box 10, and stores the confirmation time.

3) All of the ID codes 4 of the packages 2 of the shuffled playing cards stored in the management/storage box 10 for the constant time and taken out one by one from the management/storage box 10 by opening/closing the opening/closing cover of the management/storage box 10 thereafter or the packages to be used or scheduled to be used in the game table 11 thereafter are registered as the ID codes 4 of the taken out packages 2 by the registration device 70, the ID codes 4 of the packages 2 carried to the back yard 8 and the packages 2 brought into the management/storage box 10 and the ID codes 4 of the taken out packages 2 are monitored by the management control device 7, and it is monitored by the management control device 7 that the packages 2 carried to the back yard 8 and the packages 2 brought into the management/storage box 10 are surely used in the game table 11 and are surely discarded by the discard system thereafter.

In addition, it is monitored whether the ID codes 4 of all of the packages 2 carried to the back yard 8 and registered in the database DB (memory M) of the management control device 7 are deleted from the database DB during the predetermined period or are registered as the ID codes 4 of the taken out packages 2 by the registration device 70. In the case in which one of the ID codes 4 of the packages 2 is not deleted or is not authenticated as being taken out, because it means that the casino 6 has inappropriate or suspicious stock, corresponding information is transmitted to the back yard 8 or the management department 14 of the casino via the communication line 114L.

While the various embodiments of the present invention have been described, it should be understood that the embodiments can be modified by those skilled in the art within the scope of the present invention. The device according to this embodiment may be appropriately modified as necessary in a game to be applied.

REFERENCE SIGNS LIST

1: card
1a: collected card
1c: cut card
1h: discarded card
1r: card left without being used in card shooter device S
1s: shuffled playing card set
2: package
3: bar code
4: ID code
6: casino
7: management control device
7T: time stamping device
8: back yard
9: vehicle
10: management/storage box
10R: ID code reader
11: game table
12: monitoring camera
12c: monitoring camera control device
13: delivery route
14: management part
14b: database of management part
21: package arrangement part
22: carton arrangement part
23: ID code reader
24: management/storage box cover
25: scanning mechanism
26: scanning mechanism
27: fixation frame
28: grip part
30: carton ID code
31: locking mechanism
41: output mechanism
42: warning mechanism
60: monitor display
70: registration device
80: game table management device
100: card discard device
100R: ID code reading device
101: discharge port
102: reception base
106: discard card information acquisition mechanism
107: group information acquisition mechanism
108: sheet number counter
109: authenticity determination mechanism
110: output mechanism
113: deck inspection mechanism
114: control device
114C: communication part
114L: communication line
115: roller
116: drive motor
117: card sensor
118: delivery roller
119: discard card stocker -continued

REFERENCE SIGNS LIST

119f: temporary storage Stocker
119fo: cover
119o: cover
120: group information acquisition sensor
121: card information acquisition sensor
122: display lamp
156: weight
157: weight roller
158: weight roller
160: body
161: cabinet for discard
161o: door of cabinet for discard
162: cover of top surface of cabinet for discard
163a: discard card box
163b: discard card box
163o: hole formed in upper part of discard card box
164: lever
165: NG discard card box
165o: hole
166a: discard card box ID
166b: discard card box ID
167a: ID code reader
167b: ID code reader
170: code
171: group code information
172: card type notation
173: index
202: card accommodation part
203: cover
205: card guide part
206: opening part
207: card detection part (card detection sensor)
208: card reading part
209: win/lose determination part
210: control part
210M: memory
211: output part
212: result display button
213: side monitor
CA: carton
D: dealer
DB: database
M: memory
MC: mark
PA: pallet
PA-ID: pallet ID code
R: bar code reader
S: card shooter device

The invention claimed is:

1. A management system for managing packages of shuffled playing cards, the management system comprising:

packages of shuffled playing cards in which playing cards including a predetermined number of decks are shuffled in random order and are packed individually as one package and to which unique ID codes are attached;

a game table configured to play a game using the shuffled playing cards;

a card shooter device which is arranged on the game table, receives the shuffled playing cards in the packages, enables the shuffled playing cards to be manually fed one by one at the game table, and reads at least ranks of the playing cards;

a storage box which is installed on the game table, stores the packages, and includes an opening/closing cover which allows the packages to be taken out one by one;

one or more ID code readers which read ID codes of all of the packages stored in the storage box as ID codes of packages before use;

a registration device of an ID code which registers ID codes of the packages being taken out or having been taken out from the storage box, as taken out packages; and a management control device which includes a memory storing ID codes of the plurality of packages brought into the storage box and constructing a database and reads the ID codes of the plurality of packages brought into the storage box at predetermined time intervals, confirms existence of each ID code registered in the database in the storage box to determine the package removed from the storage box, and manages the ID codes of the packages before the use and ID codes of the taken out packages by comparing the ID code of the package removed from the storage box with the ID code registered as the taken out package by the registration device.

2. The management system according to claim 1, wherein the management control device further has a time stamping device which stores a confirmation time of the existence of each ID code in the storage box and stores a time when the ID codes are registered as the ID codes of the taken out package in the registration device, and the management control device is configured to be programmed to examine the packages with respect to whether or not the time from when the package does not exist in the storage box to when the ID codes are registered as the ID codes of the taken out packages in the registration device exceeds a predetermined time.

3. The management system according to claim 2, wherein the management control device is further configured to be programmed to examine the packages with respect to at least one of the following items of 1) to 3):

1) whether or not the ID codes registered as the ID codes of the taken out packages in the registration device exist in the database of the ID codes brought into the storage box;

2) whether or not the packages exist in the storage box during a predetermined period or more; and 3) whether or not the ID codes has been registered as the ID codes of the taken out packages.

4. The management system according to claim 1, wherein the management system includes at least one of:

1) a device reading the ID codes of the packages of the shuffled playing cards scheduled to be set in the card shooter device or being set in the card shooter device arranged on the game table; and 2) a device connected to a card discard device receiving the shuffled playing cards used for a game and acquiring ID codes of used packages to be discarded as the registration device of the ID codes of the taken out packages.

5. The management system according to claim 4, wherein the management control device has a database in which ID codes of contained packages can be searched from a container ID, a pallet ID, or a carton ID holding the packages, and the ID codes of the taken out packages can be acquired from the container ID, the pallet ID, or the carton ID.

6. The management system according to claim 1, wherein at least one of the following items of (1) to (4) is recorded and managed in the database in association with the ID codes of the packages of the shuffled playing cards:

(1) a game table to be used;

(2) a dealer (a person who draws a card) who is in charge of the game table to be used;

(3) expected time of each package of the shuffled playing cards to be used on the game table; and (4) information on the storage box to which each package of the shuffled playing cards is delivered.

7. The management system according to claim 1, wherein the management control device is included in a game table management device arranged on the game table and the game table management device is connected directly or indirectly to the card shooter device on the game table.

8. The management system according to claim 1, wherein the card shooter device can read at least the ranks of the shuffled playing cards manually fed one by one on the game table.

9. The management system according to claim 1, wherein the card shooter device can count a sheet number of the shuffled playing cards manually fed one by one on the game table.

10. The management system according to claim 4, wherein the card discard device receiving the shuffled playing cards used for the game can read at least the ranks of the shuffled playing cards used for the game, receive information from the card shooter device, and determine whether or not information of the shuffled playing cards manually fed one by one on the game table and information read by the card discard device are matched.

11. The management system according to claim 1, wherein the ID codes of the packages are given to the packages by an RFID.

12. A management method for managing packages of shuffled playing cards, in which playing cards including a predetermined number of decks are shuffled in random order and are packed individually as a set of shuffled playing cards and ID codes are attached to packages of the set, the management method comprising:

a step of storing the packages in a storage box which is installed at a game table, stores the plurality of packages, and includes an opening/closing cover which allows the packages to be taken out one by one;

a step of reading ID codes of the plurality of packages brought into the storage box by an ID code reader and constructing a database;

a registration step of registering ID codes of the packages of the playing cards used for a game on the game table as taken out packages;

a step of reading the ID codes of the plurality of packages brought into the storage box at predetermined time intervals, confirming existence of each ID code registered in the database in the storage box to determine the packages removed from the storage box; and a management step of managing the ID codes of the taken out packages registered in the registration step and the ID codes registered in the database by comparing the ID code of the package removed from the storage box with the ID code registered as the taken out package in the registration step.

13. The management method according to claim 12, wherein the management step specifies ID codes of packages of which existence is not confirmed in the storage box, stores time when the existence is not confirmed in the storage box, together with the ID codes of the packages of which the existence is not confirmed, stores a time when the ID codes are registered as the ID codes of the taken out packages in the registration step, and manages whether or not the time from when the existence is not confirmed to when the ID codes are registered as the ID codes of the taken out packages in the registration step exceeds a predetermined time.

14. The management method according to claim 12, wherein the registration step is a step of using a database in which ID codes of all packages contained in a carton containing the packages can be searched from a carton ID attached to the carton, reading the carton ID of the used carton to specify the ID codes of the packages contained in the carton, and registering the ID codes of all of the packages contained in the carton as the ID codes of the taken out packages.

15. The management method according to claim 12, further comprising:

a feeding card reading step of reading at least ranks of the shuffled playing cards when the shuffled playing cards are manually fed one by one on the game table by a card shooter device;

a discard card reading step of reading at least the ranks of the shuffled playing cards used for a game by a card discard device; and a determination step of determining whether or not information of the shuffled playing cards obtained by the feeding card reading step and information of the shuffled playing cards obtained by the discard card reading step are matched.

16. The management method according to claim 12, wherein the ID codes of the packages are given to the packages by an RFID.

* * * * *